US012263970B2

(12) United States Patent
Kinoshita et al.

(10) Patent No.: US 12,263,970 B2
(45) Date of Patent: Apr. 1, 2025

(54) AGRICULTURAL MACHINE

(71) Applicant: KUBOTA CORPORATION, Osaka (JP)

(72) Inventors: Tomohiro Kinoshita, Sakai (JP); Takanori Morimoto, Sakai (JP); Susumu Umemoto, Sakai (JP); Shinnosuke Ishikawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/208,391

(22) Filed: Jun. 12, 2023

(65) Prior Publication Data

US 2023/0312146 A1    Oct. 5, 2023

Related U.S. Application Data

(63) Continuation of application No. PCT/JP2021/047800, filed on Dec. 23, 2021.

(30) Foreign Application Priority Data

Dec. 29, 2020 (JP) ................................ 2020-219870
Dec. 29, 2020 (JP) ................................ 2020-219871

(51) Int. Cl.
 *B64U 70/93*    (2023.01)
 *A01B 76/00*    (2006.01)
 (Continued)

(52) U.S. Cl.
 CPC ............. *B64U 70/93* (2023.01); *B64U 10/60* (2023.01); *B64U 60/50* (2023.01); *A01B 76/00* (2013.01);
 (Continued)

(58) Field of Classification Search
 CPC .... B64U 70/93; B64U 10/60; B64U 2101/40; B64C 39/022
 See application file for complete search history.

(56) References Cited

U.S. PATENT DOCUMENTS

2012/0029732 A1*  2/2012  Meyer .................. A01B 69/008
                                                    701/2
2016/0200437 A1*  7/2016  Ryan ........................ B64F 3/00
                                                    244/99.2

(Continued)

FOREIGN PATENT DOCUMENTS

DE    102014201203 A1    7/2015
EP        3 653 051 A1    5/2020
(Continued)

OTHER PUBLICATIONS

Official Communication issued in corresponding Japanese Patent Application No. 2020-219870, mailed on Dec. 19, 2023.
(Continued)

*Primary Examiner* — Richard G Davis
(74) *Attorney, Agent, or Firm* — Keating & Bennett, LLP

(57) ABSTRACT

An agricultural machine includes a traveling vehicle body, a coupler to couple a working implement with the traveling vehicle body, and a takeoff/landing station to restrict a skid of an unmanned aerial vehicle when the unmanned aerial vehicle takes off or lands. The agricultural machine includes a protector to protect an operator's seat. The takeoff/landing station is provided on the protector. The takeoff/landing station is attached to the protector and includes an arm extending in a horizontal direction when the unmanned aerial vehicle takes off or lands.

5 Claims, 18 Drawing Sheets

(51) Int. Cl.
*B64U 10/60* (2023.01)
*B64U 60/50* (2023.01)
*B64U 101/30* (2023.01)
*B64U 101/40* (2023.01)

(52) U.S. Cl.
CPC ...... *B64U 2101/30* (2023.01); *B64U 2101/40* (2023.01)

(56) References Cited

U.S. PATENT DOCUMENTS

| | | | | |
|---|---|---|---|---|
| 2016/0318607 | A1* | 11/2016 | Desai | A01M 7/00 |
| 2017/0038779 | A1* | 2/2017 | Fujimori | G05D 1/102 |
| 2017/0161972 | A1* | 6/2017 | Moloney | G07C 5/0841 |
| 2017/0245419 | A1* | 8/2017 | Barbosa | A01B 79/005 |
| 2017/0259941 | A1* | 9/2017 | Briggs, IV | B66D 1/505 |
| 2018/0118374 | A1* | 5/2018 | Lombardini | B64F 3/02 |
| 2018/0364740 | A1* | 12/2018 | Collins | B64U 70/93 |
| 2019/0002101 | A1* | 1/2019 | Penet | B65H 75/30 |
| 2019/0106212 | A1 | 4/2019 | Furukawa et al. | |
| 2019/0256207 | A1 | 8/2019 | Nohmi et al. | |
| 2019/0276162 | A1* | 9/2019 | Shibata | B64F 1/007 |
| 2020/0148348 | A1* | 5/2020 | Bradley | B64U 10/60 |
| 2020/0231279 | A1* | 7/2020 | Buyse | B64U 10/60 |
| 2020/0255140 | A1* | 8/2020 | Nahuel-Andrejuk | G05D 1/0094 |
| 2021/0300547 | A1* | 9/2021 | Stanhope | B64F 1/16 |
| 2021/0357664 | A1* | 11/2021 | Kocer | G05D 1/0282 |
| 2021/0362856 | A1* | 11/2021 | Hashiguchi | B64U 10/60 |
| 2021/0365692 | A1* | 11/2021 | Hashiguchi | B64U 80/86 |

FOREIGN PATENT DOCUMENTS

| | | |
|---|---|---|
| JP | 2017-013653 A | 1/2017 |
| JP | 2017-036102 A | 2/2017 |
| JP | 2017-081498 A | 5/2017 |
| JP | 2017-165363 A | 9/2017 |
| JP | 2017-207815 A | 11/2017 |
| JP | 2018-075869 A | 5/2018 |
| JP | 2019-064544 A | 4/2019 |
| JP | 2019-133441 A | 8/2019 |
| JP | 2019-206235 A | 12/2019 |
| JP | 2020-018255 A | 2/2020 |
| JP | 2020-138639 A | 9/2020 |
| JP | 6763592 B1 | 9/2020 |
| JP | 2020-189614 A | 11/2020 |
| WO | 2016/159383 A1 | 10/2016 |

OTHER PUBLICATIONS

Official Communication issued in corresponding Japanese Patent Application No. 2020-219871, mailed on Feb. 6, 2024.
Official Communication issued in International Patent Application No. PCT/JP2021/047800, mailed on Mar. 22, 2022.
Official Communication issued in corresponding European Patent Application No. 21915191.7, mailed on Nov. 21, 2024, 11 pages.

* cited by examiner

Fig.5A
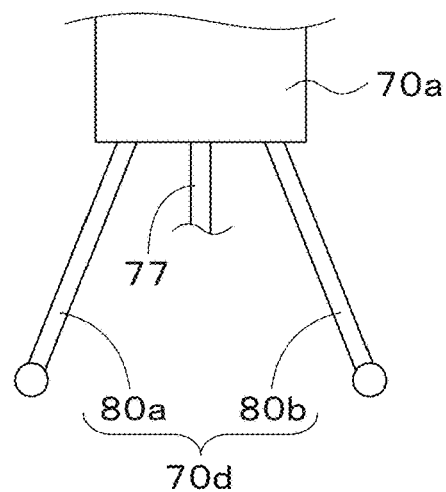
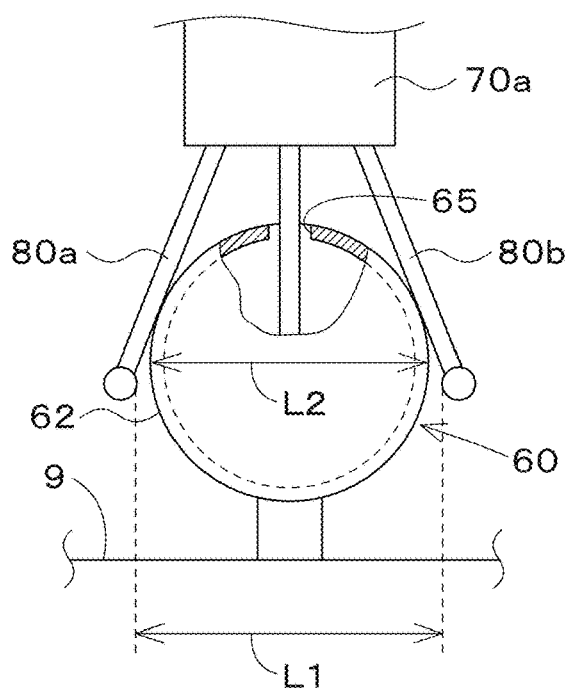

Fig.5B
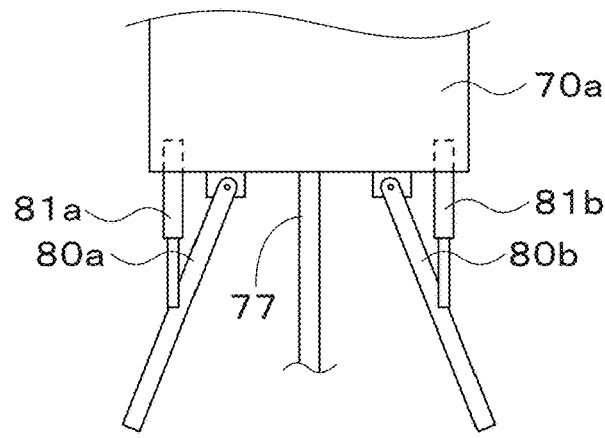
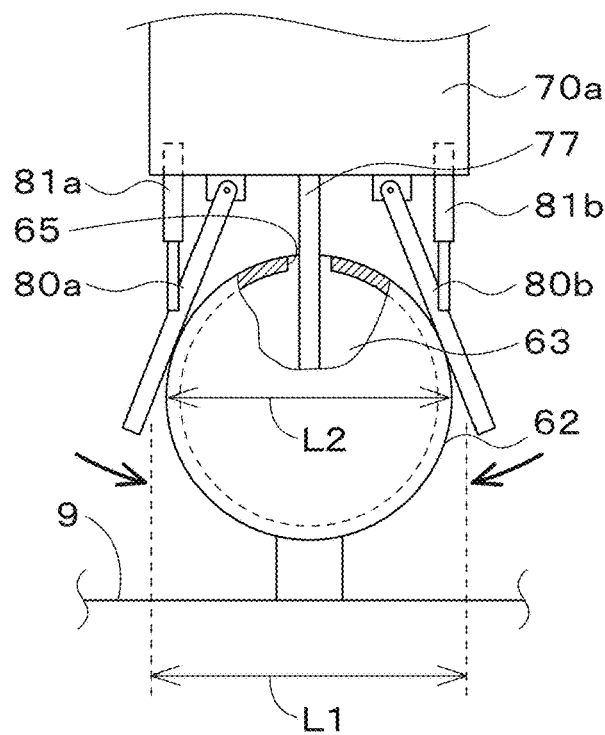

Fig.5C
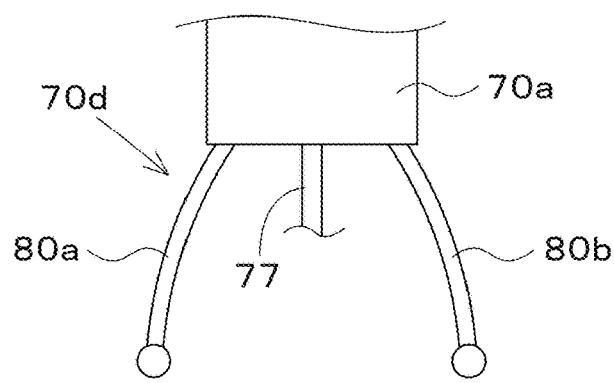
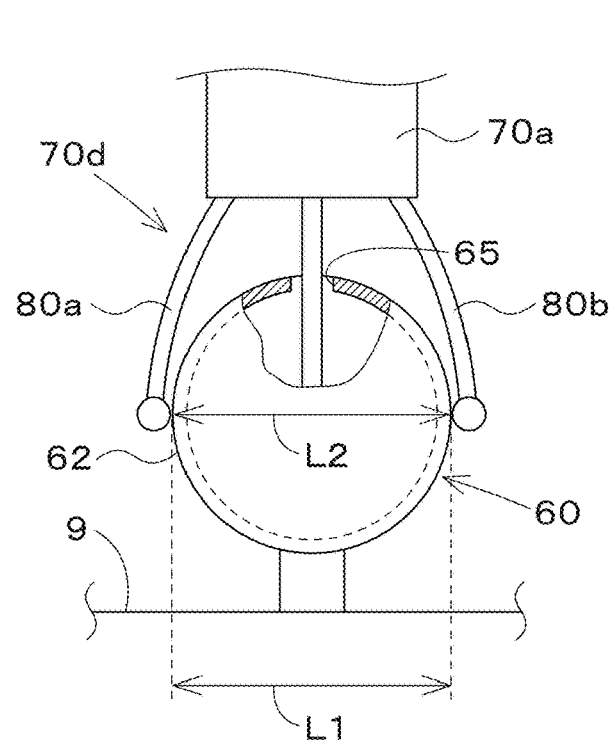

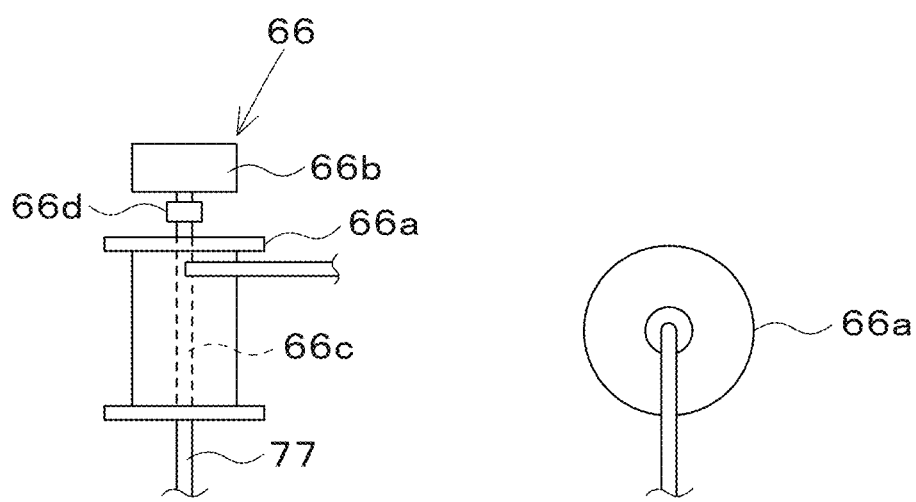

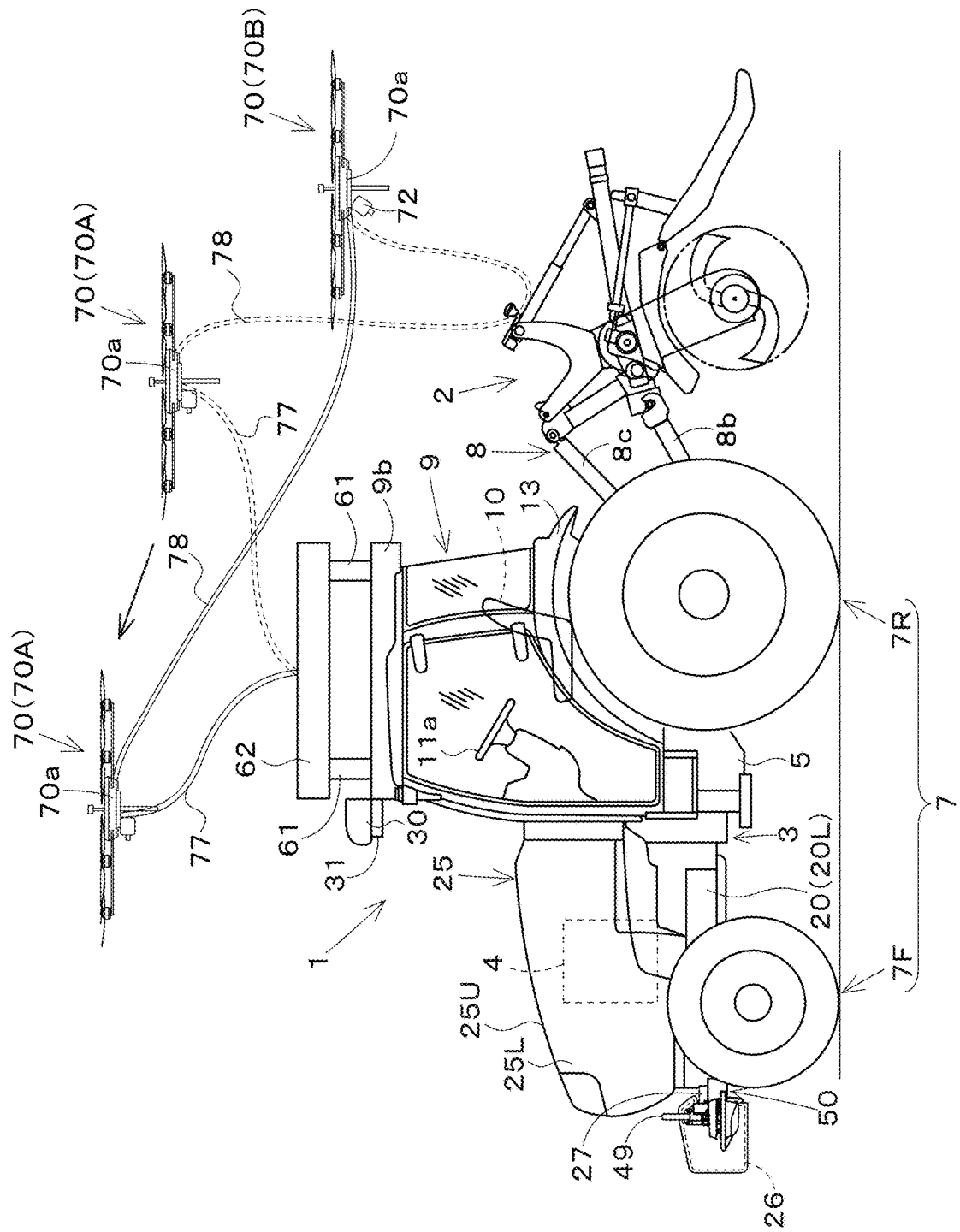

AGRICULTURAL MACHINE

CROSS REFERENCE TO RELATED APPLICATIONS

This application is a continuation application of International Application No. PCT/JP2021/047800, filed on Dec. 23, 2021, which claims the benefit of priority to Japanese Patent Application No. 2020-219870, filed on Dec. 29, 2020, and to Japanese Patent Application No. 2020-219871, filed on Dec. 29, 2020. The entire contents of each of these applications are hereby incorporated herein by reference.

BACKGROUND OF THE INVENTION

1. Field of the Invention

The present invention relates to, for example, an agricultural machine, such as a tractor, a combine, or a rice transplanter.

2. Description of the Related Art

In related art, Japanese Unexamined Patent Application Publication No. 2019-133441 is known as a technique for flying an unmanned aircraft such as a drone above a working vehicle (agricultural machine) such as a tractor. A management system for a working vehicle disclosed in Japanese Unexamined Patent Application Publication No. 2019-133441 includes a working vehicle that travels in an agricultural field, an unmanned aircraft that is equipped with a camera and that flies in the air to correspond to the working vehicle, and a mobile terminal device that communicates with the working vehicle and the unmanned aircraft. The mobile terminal device simultaneously displays vehicle information received from the working vehicle and a camera image received from the unmanned aircraft on a display.

SUMMARY OF THE INVENTION

Japanese Unexamined Patent Application Publication No. 2019-133441 discloses the technique for flying the unmanned aircraft above the agricultural machine. However, the unmanned aircraft needs to take off from or land on a location different from the agricultural field in which the agricultural machine works, and needs to move in order to fly above the agricultural machine, thereby reducing work efficiency.

Also, since the unmanned aircraft flies using a battery, it is difficult to fly the unmanned aircraft over the agricultural machine for a long time. Further, since one unmanned aircraft is assigned to one agricultural machine, there is a limit to monitoring a surrounding area or the like of the agricultural machine using the unmanned aircraft. That is, when work is performed while the unmanned aircraft flies above the agricultural machine, the work efficiency may be reduced.

Preferred embodiments of the present invention provide agricultural machines each of which is capable of improving work efficiency.

An agricultural machine according to a preferred embodiment of the present invention includes a traveling vehicle body, a coupler to couple a working implement with the traveling vehicle body, and a takeoff/landing station to be able to restrict a skid of an unmanned aerial vehicle when the unmanned aerial vehicle takes off or lands.

The agricultural machine may include a protector to protect an operator's seat. The takeoff/landing station may be provided on the protector.

The takeoff/landing station may be attached to the protector and include an arm extending in a horizontal direction when the unmanned aerial vehicle takes off or lands.

The arm may include a first member fixed to the protector and a second member movably provided on the first member.

The arm may include a marker visually recognizable by the unmanned aerial vehicle.

The unmanned aerial vehicle may include a cable to supply electric power. The takeoff/landing station may include a housing to house the cable.

The takeoff/landing station may include a winder to wind the cable.

An agricultural machine according to a preferred embodiment of the present invention includes a traveling vehicle body, a first cable attached to the traveling vehicle body and coupled to a first unmanned aerial vehicle, and a second cable to couple the first unmanned aerial vehicle with a second unmanned aerial vehicle different from the first unmanned aerial vehicle.

The first cable and the second cable may be operable to supply electric power.

The first cable and the second cable may be operable to transmit and receive a signal to and from the first unmanned aerial vehicle and the second unmanned aerial vehicle.

The agricultural machine may further include a protector to protect an operator's seat. The first cable may be provided on the protector.

The second unmanned aerial vehicle may include a sensor to sense a working implement coupled to the traveling vehicle body, and be operable to fly toward the working implement when sensing the working implement. The first unmanned aerial vehicle may be operable to fly in association with flight of the second unmanned aerial vehicle.

The sensor may include an imager to capture an image of the working implement.

The first unmanned aerial vehicle may include a sensor to sense a working implement coupled to the traveling vehicle body.

The agricultural machine may include a takeoff/landing station for takeoff and landing of at least one of the first unmanned aerial vehicle or the second unmanned aerial vehicle. The second unmanned aerial vehicle may be operable to fly while the first unmanned aerial vehicle is on the takeoff/landing station.

The traveling vehicle body may include a winder to wind the first cable.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5A illustrates a skid of an unmanned aerial vehicle and a landing station.

FIG. 5B illustrates a skid different from that illustrated in FIG. 5A and the landing station.

FIG. 5C illustrates a skid different from those illustrated in FIG. 5A and FIG. 5B and the landing station.

FIG. 7 illustrates a winder.

FIG. 11A illustrates flight of the first aerial vehicle and the second unmanned aerial vehicle.

DETAILED DESCRIPTION OF THE PREFERRED EMBODIMENTS

Figure 1:
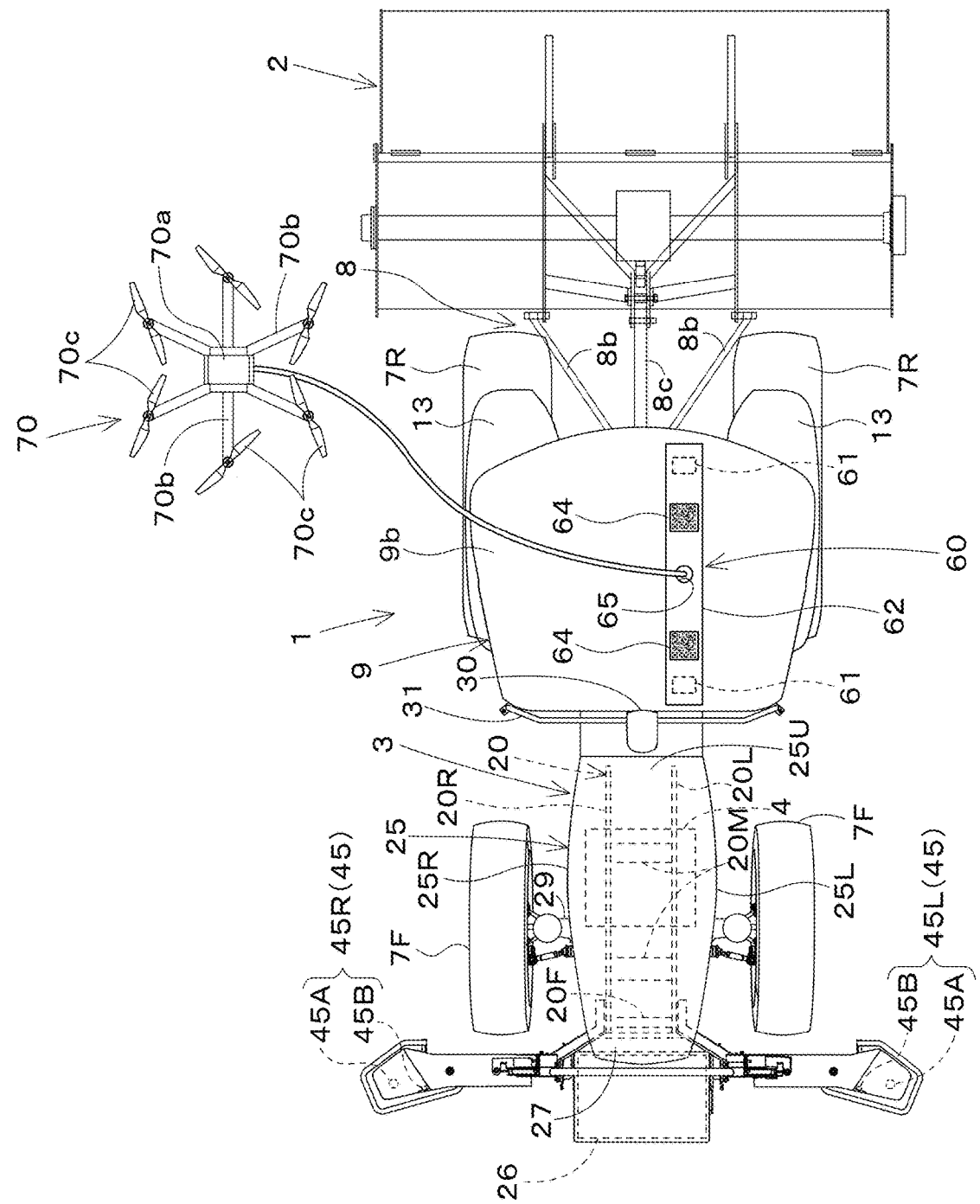
FIG. 1 is an overall plan view of a tractor and an unmanned aerial vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings.

Figure 2:
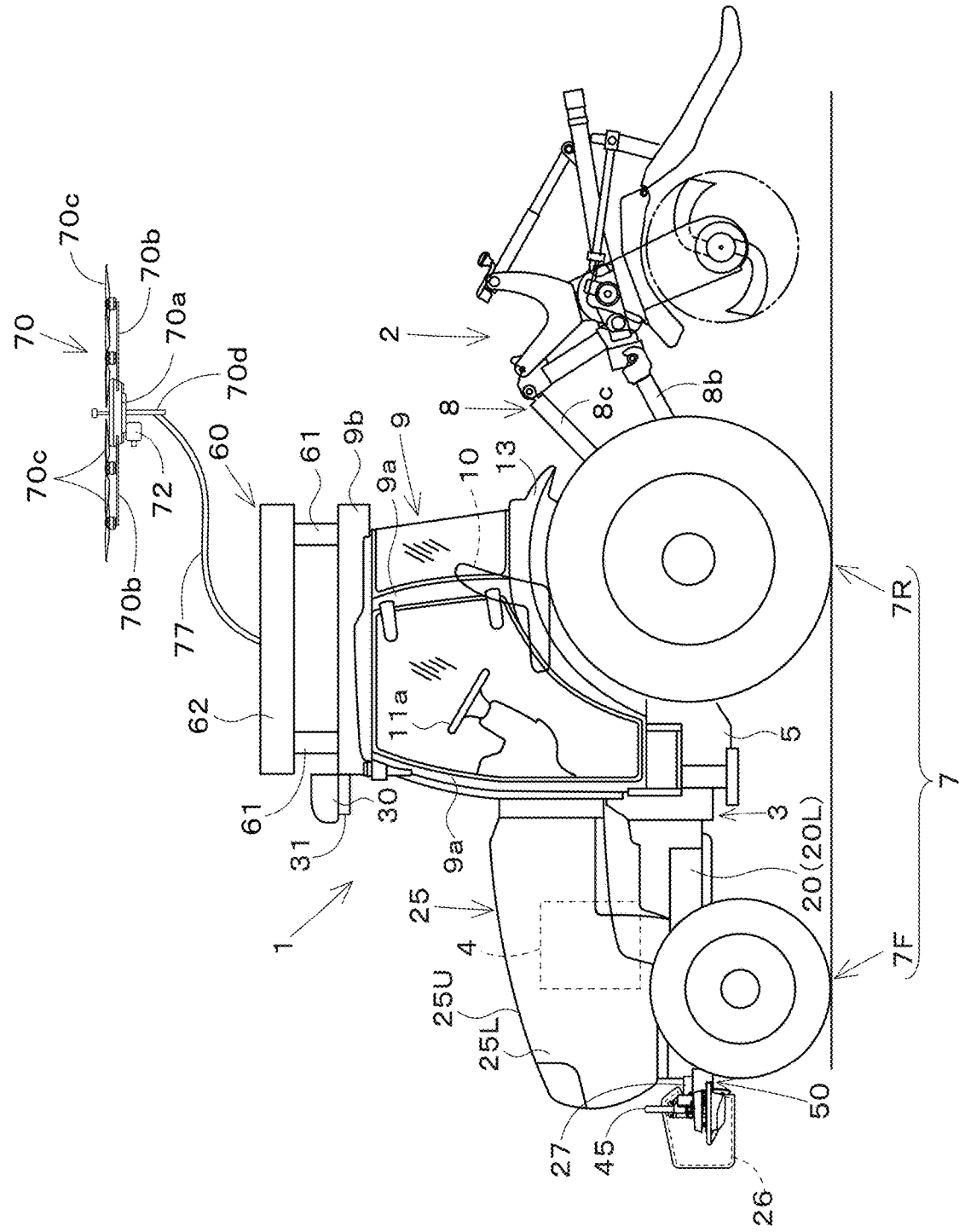
FIG. 2 is an overall side view of the tractor and the unmanned aerial vehicle.

FIG. 1 and FIG. 2 illustrate an entire agricultural machine. The agricultural machine is, for example, a tractor, a combine, or a rice transplanter. In the present preferred embodiment, an agricultural machine will be described using a tractor 1 as an example.

As illustrated in FIG. 1 and FIG. 2, the tractor 1 includes a vehicle body (traveling vehicle body) 3, a prime mover 4, and a transmission 5. The vehicle body 3 is provided with a traveling device 7. The traveling device 7 supports the vehicle body 3 so that the vehicle body 3 can travel, and includes at least one front wheel 7F and a rear wheel 7R. The front wheel 7F and the rear wheel 7R are of a tire type in the case of the present preferred embodiment, but may be of a crawler type. The prime mover 4 is, for example, an engine (diesel engine, gasoline engine) or an electric motor. The transmission 5 can switch the propelling force of the traveling device 7 by speed-changing, and can switch the traveling device 7 to forward traveling or backward traveling. The vehicle body 3 is provided with an operator's seat 10. The operator's seat 10 is protected by a protector 9. The protector 9 is, for example, a cabin that protects the operator's seat 10, or a ROPS that protects the operator's seat 10 by covering at least an area above the operator's seat 10.

As illustrated in FIG. 1 and FIG. 2, the protector 9 includes a plurality of pillars 9a fixed to the vehicle body 3, and a roof 9b supported by the plurality of pillars 9a and disposed above the operator's seat 10. When the protector 9 is a cabin, for example, a glass and a door are provided between the plurality of pillars 9a, and the protector 9 covers the operator's seat 10 with the glass and the door. A fender 13 is attached below the protector 9. The fender 13 covers an upper portion of the rear wheel 7R.

As illustrated in FIG. 1, the vehicle body 3 includes a vehicle body frame 20. The vehicle body frame 20 includes a vehicle body frame 20L provided on the left and a vehicle body frame 20R provided on the right. Each of the vehicle body frame 20L and the vehicle body frame 20R is disposed to extend in a front-rear direction at a position near the transmission 5 in the vehicle body 3, and supports a lower portion of the prime mover 4. The vehicle body frame 20L and the vehicle body frame 20R are separated from each other in a vehicle-body width direction. A front end portion of the vehicle body frame 20L and a front end portion of the vehicle body frame 20R are coupled by a front coupling plate 20F. A middle portion of the vehicle body frame 20L and a middle portion of the vehicle body frame 20R are coupled by a middle coupling plate 20M. The vehicle body frame 20L and the vehicle body frame 20R support a front axle case 29. The front axle case 29 houses a front axle that rotatably supports the front wheel 7F. That is, in the case of the present preferred embodiment, the vehicle body frame 20 is a front axle frame that supports the front axle. Alternatively, the vehicle body frame 20 may be a frame (a frame other than the front axle frame) that supports a structure other than the front axle case 29.

As illustrated in FIG. 1 and FIG. 2, a hood 25 is provided above the vehicle body frame 20. The hood 25 is disposed at a center portion in a width direction of the vehicle body frame 20 and extends in the front-rear direction along the vehicle body frame 20. The hood 25 is disposed forward of the protector 9. The hood 25 includes a left sidewall 25L provided on one side (left) in the width direction of the vehicle body frame 20, a right sidewall 25R provided on the other side (right) in the width direction of the vehicle body frame 20, and an upper wall 25U that couples upper portions of the left sidewall 25L and the right sidewall 25R. That is, the left sidewall 25L defines a surface on one side (left) in a width direction of the hood 25, the right sidewall 25R defines a surface on the other side (right) in the width direction of the hood 25, and the upper wall 25U defines a surface of an upper portion in the width direction of the hood 25. Thus, an engine room is formed by the left sidewall 25L, the right sidewall 25R, and the upper wall 25U. The engine room houses the prime mover 4, a cooling fan, a radiator, a battery, and so forth. The front wheel 7F is disposed on each of the left of the left sidewall 25L and the right of the right sidewall 25R.

A weight 26 is provided forward of the hood 25, that is, forward of the vehicle body frames 20L and 20R. The weight 26 is attached to a weight bracket (weight attachment) 27 provided at a front portion of the vehicle body 3. The weight bracket 27 is attached to the front coupling plate 20F coupling the vehicle body frame 20L and the vehicle body frame 20R by a fastener such as a bolt.

A coupler 8 is provided at a rear portion of the vehicle body 3. The coupler 8 is a device that detachably couples a working implement (implement or the like) 2 with the vehicle body 3. The coupler 8 includes, for example, a swinging drawbar that couples the working implement 2 and the vehicle body 3 and does not perform raising or lowering, or a raising/lowering device that includes a three-point linkage or the like and performs raising or lowering. The working implement 2 is, for example, a cultivator for cultivation, a fertilizer spreader for spreading a fertilizer, an agricultural chemical spreader for spreading an agricultural chemical, a harvester for harvesting, a mower for cutting grass or the like, a tedder for spreading grass or the like, a rake for collecting grass or the like, or a baler for shaping grass or the like.

Figure 3:
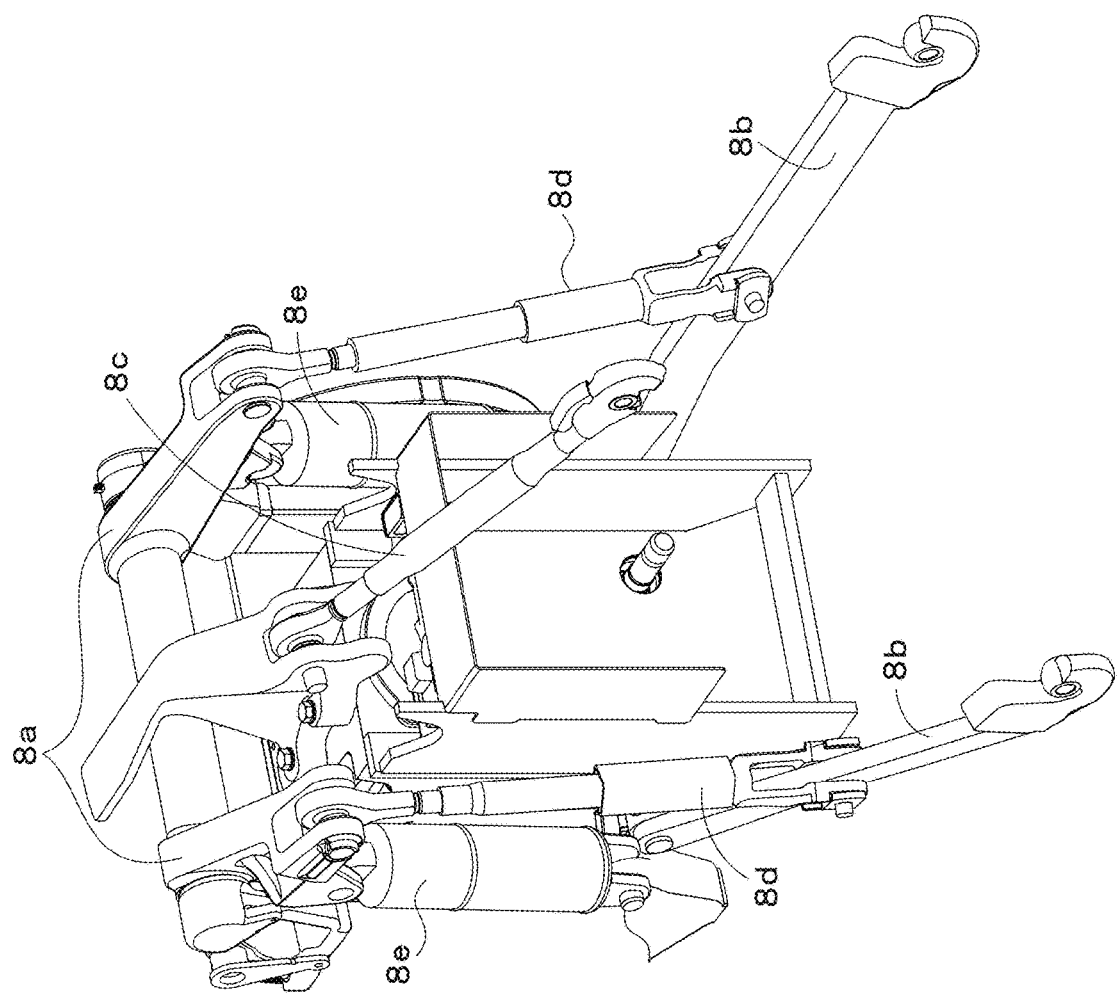
FIG. 3 is a perspective view of a raising/lowering device.

FIG. 3 illustrates the coupler 8 including the raising/lowering device. As illustrated in FIG. 3, the coupler (raising/lowering device) 8 includes a lift arm 8a, a lower link 8b, a top link 8c, a lift rod 8d, and a lift cylinder 8e. A front end portion of the lift arm 8a is supported by a rear upper portion of a case (transmission case) that houses the transmission 5 so as to be swingable upward or downward. The lift arm 8a is swung (raised or lowered) by driving of the lift cylinder 8e. The lift cylinder 8e includes a hydraulic cylinder. The lift cylinder 8e is connected to a hydraulic pump via a control valve 36. The control valve 36 is a solenoid valve or the like, and extends or contracts the lift cylinder 8e.

A front end portion of the lower link 8b is supported by a rear lower portion of the transmission 5 so as to be swingable upward or downward. A front end portion of the top link 8c is supported by a rear portion of the transmission 5, at a position above the lower link 8b so as to be swingable upward or downward. The lift rod 8d couples the lift arm 8a and the lower link 8b. The working implement 2 is coupled to a rear portion of the lower link 8b and a rear portion of the top link 8c. When the lift cylinder 8e is driven (extended or contracted), the lift arm 8a is raised or lowered, and the lower link 8b coupled to the lift arm 8a via the lift rod 8d is raised or lowered. Consequently, the working implement 2 swings upward or downward (is raised or lowered) with a front portion of the lower link 8b as a fulcrum.

As illustrated in FIG. 1 and FIG. 2, the tractor 1 includes a position detector (first position detector) 30. The first position detector 30 is mounted forward of the roof 9b of the protector 9 via a mount 31. However, the mount position of the first position detector 30 is not limited to the illustrated position, and the first position detector 30 may be mounted on the roof 9b of the protector 9, or may be mounted at another position of the vehicle body 3. Also, the first position detector 30 may be mounted on the working implement 2 such as the above-described cultivator.

The first position detector 30 is a device that detects the position (measured position information including latitude and longitude) of the first position detector 30 by a satellite positioning system. That is, the first position detector 30 receives signals (positions of positioning satellites, transmission times, correction information, and so forth) transmitted from the positioning satellites and detects a position (latitude and longitude) based on the received signals. The first position detector 30 may detect a position corrected based on a signal of correction or the like from a base station (reference station) capable of receiving signals from the positioning satellites as the position (latitude and longitude) of the first position detector 30. Alternatively, the first position detector 30 may include an inertial measurement unit such as a gyroscope sensor or an acceleration sensor, and may detect a position corrected by the inertial measurement unit as the position of the first position detector 30. The first position detector 30 can detect the position (travel position) of the vehicle body 3 of the tractor 1.

As illustrated in FIG. 1, the tractor 1 includes a plurality of obstacle detectors 45. Each of the plurality of obstacle detectors 45 can detect an object, that is, an obstacle present in a surrounding area of the tractor 1. At least one of the plurality of obstacle detectors 45 is provided at a position that is forward of the protector 9 and outside in the width direction of the hood 25. That is, the at least one obstacle detector 45 is disposed in a region on the left of the left sidewall 25L of the hood 25 or in a region on the right of the right sidewall 25R of the hood 25 in a region located forward of the protector 9 of the tractor 1. In the case of the present preferred embodiment, the plurality of obstacle detectors 45 include an obstacle detector 45L provided on the left of the vehicle body 3 (the left of the hood 25) and an obstacle detector 45R provided on the right of the vehicle body 3 (the right of the hood 25).

The obstacle detectors 45 each are a laser scanner 45A, a sonar 45B, or the like. The laser scanner 45A detects an object (obstacle) by emitting a laser beam as a detection wave. The laser scanner 45A detects the distance to the obstacle based on the time from irradiation with the laser beam to reception of the laser beam. The sonar 45B detects an object (obstacle) by emitting a sound wave as a detection wave. Alternatively, the plurality of obstacle detectors 45 of the above-described preferred embodiment do not have to be provided outside the hood 25, and the arrangement or the like of the plurality of obstacle detectors 45 is not limited.

Figure 4:
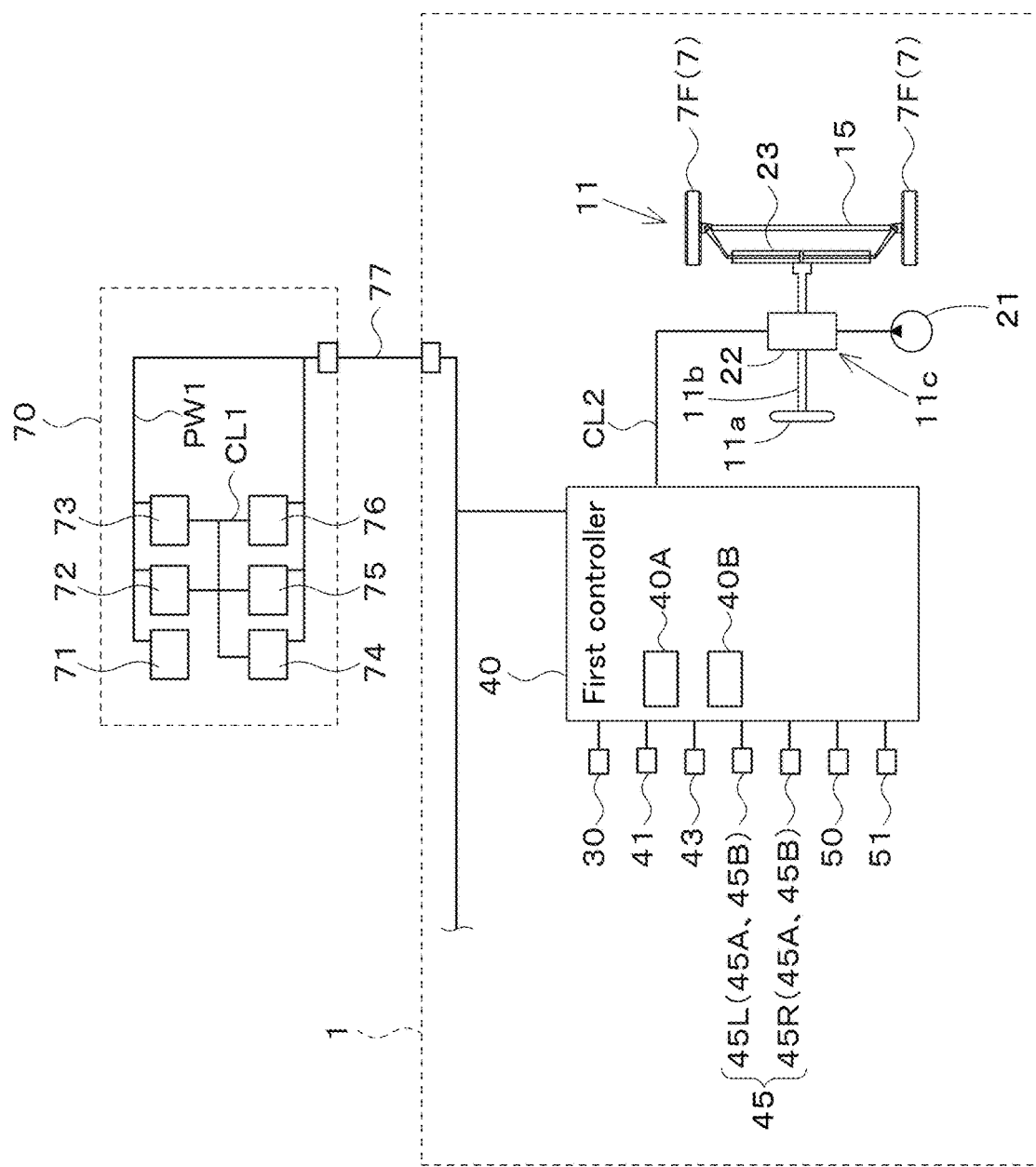
FIG. 4 is a control block diagram.

As illustrated in FIG. 4, the tractor 1 includes a steering device 11. The steering device 11 includes a handle (steering wheel) 11a, a rotation shaft (steering shaft) 11b that rotates with rotation of the handle 11a, and an assist mechanism (power steering mechanism) 11c that assists steering of the handle 11a. The assist mechanism 11c includes a hydraulic pump 21, a control valve 22 to which a hydraulic fluid delivered from the hydraulic pump 21 is supplied, and a steering cylinder 23 that is actuated by the control valve 22. The control valve 22 is a solenoid valve that is actuated based on a control signal. The control valve 22 is, for example, a three-position switching valve that can be switched by movement of a spool or the like. The control valve 22 can be also switched by steering of the steering shaft 11b. The steering cylinder 23 is connected to arms (knuckle arms) that change the direction of the front wheel 7F.

Thus, when the handle 11a is operated, the switching position and the opening of the control valve 22 are switched in accordance with the handle 11a, and the steering cylinder 23 is extended or contracted to the left or the right in accordance with the switching position and the opening of the control valve 22. Hence, the steering direction of the front wheel 7F can be changed. The above-described steering device 11 is an example, and the configuration of the steering device 11 is not limited to the above-described configuration.

As illustrated in FIG. 4, the tractor 1 includes a controller (first controller 40), a display 50, and a communication device (first communication device) 51. The first controller 40 includes a CPU, an electric circuit, an electronic circuit, or the like, and performs various types of control of the tractor 1. The display 50 includes a liquid crystal panel, an organic EL panel, or the like, and displays various items of information. The first communication device 51 is a device that communicates with an external device. The first communication device 51 is a communication device (communication module) that performs one of direct communication and indirect communication with an external device. For example, the first communication device 51 can perform wireless communication according to a communication standard, such as IEEE802.11 series Wireless Fidelity (Wi-Fi, registered trademark), Bluetooth (registered trademark)

Low Energy (BLE), Low Power, Wide Area (LPWA), or Low-Power Wide-Area Network (LPWAN). Alternatively, the first communication device 51 may be a communication device (communication module) that performs wireless communication through a mobile phone communication network, a data communication network, or the like.

A state detector 41 that detects a driving state or the like of the tractor 1 is connected to the first controller 40.

The state detector 41 is, for example, a device that detects a state of a traveling system, and detects the state of the traveling system with, for example, a crank sensor, a cam sensor, an engine rotation sensor, an accelerator sensor, a vehicle speed sensor, a steering angle sensor, or the first position detector 30. The state detector 41 also includes a device that detects a state other than the state of the traveling system, for example, a raising/lowering operation detection sensor that detects an operation direction, an operation amount, or the like, of a raising/lowering operation member, or a PTO rotation detection sensor.

The first controller 40 controls a traveling system and a working system in the tractor 1. The first controller 40 includes a traveling controller 40A and a raising/lowering controller 40B. The traveling controller 40A and the raising/lowering controller 40B include an electric/electronic circuit provided in the first controller 40, a program stored in the first controller 40, and so forth.

The traveling controller 40A performs automatic traveling control. In the automatic traveling control, the traveling controller 40A sets the switching position and the opening of the control valve 22 so that at least a travel position (the position detected by the first position detector 30) of the vehicle body 3 matches a preset planned travel line (travel path). In other words, the first controller 40 sets the moving direction and the moving amount of the steering cylinder 23 (the steering direction and the steering angle of the front wheel 7F) so that the travel position of the tractor 1 matches the planned travel line.

Specifically, the traveling controller 40A compares the travel position of the vehicle body 3 with the planned travel line, and when the travel position matches the planned travel line, the traveling controller 40A maintains the steering angle and the steering direction of the handle 11a in the steering device 11 (the steering angle and the steering direction of the front wheel 7F) without changing the steering angle and the steering direction. Specifically, when the travel position matches the planned travel line, the traveling controller 40A maintains the opening and the switching position of the control valve 22 without changing the opening and the switching position. When the travel position does not match the planned travel line, the traveling controller 40A changes the steering angle and/or the steering direction of the handle 11a in the steering device 11 so that the deviation (displacement) between the travel position and the planned travel line becomes zero. Specifically, when the travel position does not match the planned travel line, the traveling controller 40A changes the opening and/or the switching position of the control valve 22.

In the above-described preferred embodiment, the traveling controller 40A changes the steering angle of the steering device 11 based on the deviation between the travel position and the planned travel line in the automatic traveling control. However, when the orientation of the planned travel line is different from the orientation (vehicle body orientation) of an advancing direction (traveling direction) of the tractor 1 (vehicle body 3), the traveling controller 40A may set the steering angle so that the vehicle body orientation matches the orientation of the planned travel line. Alternatively, in the automatic traveling control, the traveling controller 40A may set a final steering angle in the automatic traveling control based on the steering angle obtained based on the deviation (position deviation) and the steering angle obtained based on the orientation deviation. Still alternatively, the steering angle may be set by a method different from the method of setting the steering angle in the above-described automatic traveling control.

In the automatic traveling control, the traveling controller 40A may control the traveling device 7, that is, the rotational speed of the front wheel 7F and/or the rear wheel 7R so that the actual vehicle speed of the tractor 1 (vehicle body 3) matches the vehicle speed corresponding to the preset planned travel line.

Also, the traveling controller 40A controls the automatic traveling based on the detection result of an obstacle by the obstacle detector 45. For example, the automatic traveling is continuously performed when the obstacle detector 45 does not detect an obstacle, and the automatic traveling is stopped when the obstacle detector 45 detects an obstacle. More specifically, when the obstacle detector 45 detects an obstacle, and when the distance between the obstacle and the tractor 1 is a predetermined threshold (stop threshold) or less, the traveling controller 40A stops the automatic traveling by stopping traveling of the tractor 1.

Also, the traveling controller 40A continues the automatic traveling when a seating detector 43 detects seating of the operator during the automatic traveling, and stops the automatic traveling when the seating detector 43 does not detect seating of the operator during the automatic traveling.

In the above-described preferred embodiment, when the distance between the obstacle and the tractor 1 is the predetermined threshold (stop threshold) or less, the traveling controller 40A stops the traveling of the tractor 1 in the automatic traveling. However, the traveling controller 40A may avoid the obstacle or may reduce the speed of the tractor 1 to travel at a low speed.

The raising/lowering controller 40B performs raising/lowering control. When a manual raising/lowering function is enabled, and when the raising/lowering operation member is operated in a raising direction (upward), the raising/lowering controller 40B controls a control valve 34 to extend the lift cylinder 8e and raise a rear end portion (an end portion near the working implement 2) of the lift arm 8a. In the raising/lowering control, when the manual raising/lowering function is enabled, and when the raising/lowering operation member is operated in a lowering direction (downward), the control valve 34 is controlled to contract the lift cylinder 8e and lower the rear end portion (the end portion near the working implement 2) of the lift arm 8a. When the working implement 2 is raised by the coupler (raising/lowering device) 8, and when the position of the working implement 2, that is, the angle of the lift arm 8a reaches an upper limit (height upper limit value) set by a height setting dial, the raising operation in the coupler (raising/lowering device) 8 is stopped.

In the raising/lowering control, when a backup function is enabled, and when the vehicle body 3 travels backward, the control valve 34 is automatically controlled to extend the lift cylinder 8e, and the rear end portion (the end portion near the working implement 2) of the lift arm 8a is raised. In the raising/lowering control, when an auto-up function is enabled, and when the steering angle of the steering device 11 becomes a predetermined angle or more, the control valve 34 is automatically controlled to extend the lift cylinder 8e and raise the rear end portion (the end portion near the working implement 2) of the lift arm 8a.

As illustrated in FIG. 1 and FIG. 2, the tractor 1 includes a takeoff/landing station 60. An unmanned aerial vehicle 70 can take off from or land on the takeoff/landing station 60. The unmanned aerial vehicle 70 is, for example, a multicopter.

Hereinafter, the unmanned aerial vehicle 70 will be described using a multicopter as an example.

As illustrated in FIG. 2, the unmanned aerial vehicle (multicopter) 70 includes a main body 70a, a plurality of support arms 70b provided at the main body 70a, a plurality of rotor blades 70c provided at the support arms 70b, and a skid 70d provided at the main body 70a. The plurality of rotor blades 70c each are a device that generates a lift for flight. The unmanned aerial vehicle 70 is provided with at least two or more, or preferably four or more rotor blades 70c. Each of the plurality of rotor blades 70c includes a rotor that applies a rotational force and a blade (propeller) that rotates by driving of the rotor.

FIGS. 5A to 5C illustrate examples of skids 70d. In this preferred embodiment, the unmanned aerial vehicle 70 includes one of the skids 70d illustrated in FIGS. 5A to 5C, but the structure of the skid 70d is not limited to the structures illustrated in FIGS. 5A to 5C.

As illustrated in FIG. 5A, the skid 70d includes a plurality of legs 80a and 80b. Proximal end portions of the plurality of legs 80a and 80b are fixed to the main body 70a, and distal end portions of the legs 80a and 80b are free ends. The plurality of legs 80a and 80b are made of metal or the like and are not deformable. Each of the plurality of legs 80a and 80b gradually shifts outward as it extends away from the main body 70a, and the legs 80a and 80b form an inverted V shape in a side view.

FIG. 5B illustrates a skid 70d different from the skid 70d illustrated in FIG. 5A. As illustrated in FIG. 5B, the skid 70d includes a plurality of legs 80a and 80b and a plurality of actuators 81a and 81b.

Proximal end portions (upper end portions) of the plurality of legs 80a and 80b are swingably attached to a main body 70a, and distal end portions (lower end portions) of the legs 80a and 80b are free ends.

The actuators 81a and 81b are devices that swing the plurality of legs 80a and 80b, and include, for example, cylinders that can be extended or contracted by electric power or the like. A proximal end portion of the actuator 81a is fixed to the main body 70a, and a distal end portion of the actuator 81a is coupled to the leg 80a. A proximal end portion of the actuator 81b is fixed to the main body 70a, and a distal end portion of the actuator 81b is coupled to the leg 80b.

Thus, when the actuator 81a is extended or contracted, the leg 80a is swung by the extension or contraction of the actuator 81a with the proximal end portion serving as a swing fulcrum. Also, when the actuator 81b is extended or contracted, the leg 80b is swung by the extension or contraction of the actuator 81b with the proximal end portion serving as a swing fulcrums.

FIG. 5C illustrates a skid 70d different from the skids 70d illustrated in FIG. 5A and FIG. 5B. The skid 70d includes a plurality of legs 80a and 80b. Proximal end portions of the plurality of legs 80a and 80b are fixed to the main body 70a, and distal end portions of the legs 80a and 80b are free ends. The plurality of legs 80a and 80b are made of metal, resin, or the like, and are deformable. Each of the plurality of legs 80a and 80b is different from those illustrated in FIG. 5A and FIG. 5B, and gradually shifts outward (separating direction) as it extends away from the main body 70a, and then shifts inward (approaching direction) as it extends from a middle portion to a distal end portion. The legs 80a and 80b form an arc shape.

As illustrated in FIG. 4, the unmanned aerial vehicle 70 includes a power storage 71, a sensor 72, a position detector (second position detector) 73, a memory 74, a communication device (second communication device) 75, and a controller (second controller) 76. The power storage 71 is a battery, a capacitor, or the like, and stores electric power. The power storage 71 is attached to, for example, the inside of the main body 70a, or the main body 70a.

The sensor 72 includes a CCD camera, an infrared camera, or the like, and is detachably provided at a lower portion of the main body 70a, or is provided at the main body 70a via a bracket (not illustrated). The sensor 72 is swingable in a vertical direction or a horizontal direction with respect to the bracket so that a sensing direction can be changed. The swing of the sensor 72 in the horizontal direction or the vertical direction can be controlled by the second controller 76. For example, when the operator controls the unmanned aerial vehicle 70 with a remote controller, and when the second controller 76 acquires a control signal transmitted from the remote controller via the second communication device 75, the second controller 76 causes the sensor 72 to swing in the horizontal direction or the vertical direction in accordance with the acquired control signal.

For example, when the unmanned aerial vehicle 70 flies over an agricultural field, the unmanned aerial vehicle 70 can sense the agricultural field with the sensor 72. When the sensor 72 is a CCD camera, for example, several tens to several hundreds of fragment images of the agricultural field are captured by aerial imaging of the agricultural field from a height of about 100 m above the agricultural field. The plurality of images captured by aerial imaging, that is, the plurality of images (aerial images) captured by the sensor 72 are stored in the memory 74 provided in the unmanned aerial vehicle 70. The plurality of aerial images stored in the memory 74 of the unmanned aerial vehicle 70 can be output to an external device by the second communication device 75.

Similarly to the first position detector 30, the second position detector 73 is a device that detects the position (measured position information including latitude and longitude) of the second position detector 73 by a satellite positioning system, and has a configuration similar to the first position detector 30. The position of the second position detector 73 detected by the second position detector 73 may be referred to as a "flight position". The second position detector 73 can also detect height information of the second position detector 73, that is, the altitude of the unmanned aerial vehicle 70.

The second communication device 75 is a communication device (communication module) that performs one of direct communication and indirect communication with an external device. For example, the second communication device 75 can perform wireless communication according to a communication standard, such as IEEE802.11 series Wireless Fidelity (Wi-Fi, registered trademark), Bluetooth (registered trademark) Low Energy (BLE), Low Power, Wide Area (LPWA), or Low-Power Wide-Area Network (LP-WAN). Alternatively, the second communication device 75 may be a communication device (communication module) that performs wireless communication through a mobile phone communication network, a data communication network, or the like.

The second communication device 75 can communicate with another unmanned aerial vehicle 70, communicate with the first communication device 51 of the tractor 1, and communicate with the remote controller, thereby transmitting or receiving various data. For example, the second communication device 75 can receive operation information of the tractor 1 from the tractor 1 via the first communication device 51.

The second controller 76 is a device that controls the plurality of rotor blades 70c. The second controller 76 includes, for example, a CPU. When the unmanned aerial vehicle 70 includes at least two rotor blades 70c, the second controller 76 outputs control signals to the rotors to make the rotational speed of one blade lower than the rotational speed of the other blade, thus causing the unmanned aerial vehicle to advance toward the one blade, or to make the rotational speed of the other blade lower than the rotational speed of the one blade, thus causing the unmanned aerial vehicle to advance toward the other blade. That is, the second controller 76 controls the advancing direction of the unmanned aerial vehicle 70 by making the rotational speed of a blade in the advancing direction of the plurality of blades lower than the rotational speed of a blade in a direction opposite to the advancing direction. Also, the second controller 76 causes the unmanned aerial vehicle 70 to hover by making the rotational speed of the plurality of blades constant.

The unmanned aerial vehicle 70 may be an aerial vehicle that is controlled by a remote controller operated by the operator or an aerial vehicle that flies autonomously, and a control method thereof is not limited.

The takeoff/landing station 60 is provided on the roof 9b of the protector 9 and can restrict the skid 70d when the unmanned aerial vehicle 70 takes off or lands. As illustrated in FIGS. 5A to 5C, when the unmanned aerial vehicle 70 lands, a portion of the takeoff/landing station 60 comes into contact with the legs 80a and 80b of the skid 70d, and hence the takeoff/landing station 60 can restrict movement in the horizontal direction of the skid 70d.

Figure 6:
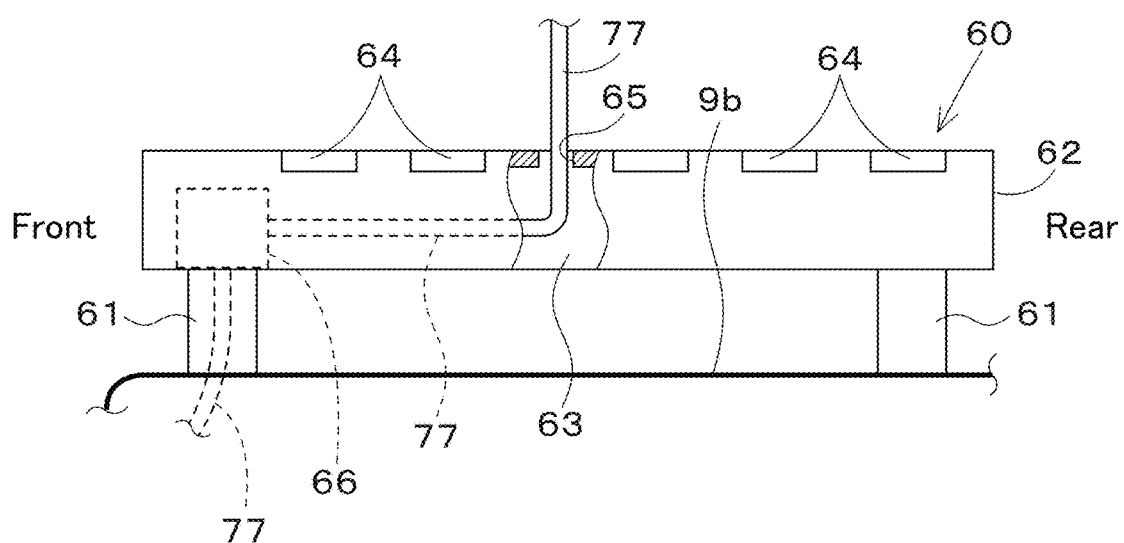
FIG. 6 is an enlarged view of the landing station.

As illustrated in FIG. 1, FIG. 2, and FIG. 6, specifically, the takeoff/landing station 60 includes at least one support member 61 and an arm 62. The support member 61 is a member that supports the arm 62 on the roof 9b of the protector 9, and is provided on each of a front portion and a rear portion of the roof 9b. The arm 62 is supported on the roof 9b via the support members 61 and extends in the horizontal direction. Specifically, one end of the arm 62 is positioned at a front end of the roof 9b, and the other end of the arm 62 is positioned at a rear end of the roof 9b.

The arm 62 is formed of, for example, a cylindrical body having an arc shape or a quadrangle shape, is hollow, and has a space 63 formed therein. As illustrated in FIGS. 5A to 5C, in the unmanned aerial vehicle 70, when a distance L1 from one leg 80a to the other leg 80b at the time of landing is used as a reference, a width L2 of the arm 62 is set to be the distance L1 or less.

As illustrated in FIG. 1, the arm 62 includes a marker 64 that is visually recognizable by the unmanned aerial vehicle 70. The marker 64 is formed on an outer surface of the arm 62, and can be recognized by the sensor 72 of the unmanned aerial vehicle 70 from above when the arm 62 is seen in a plan view.

As illustrated in FIGS. 5A to 5C, when the unmanned aerial vehicle 70 lands, the presence or absence of the tractor 1, that is, the position of the marker 64 provided on the arm 62 is first recognized by the sensor 72 from above the agricultural field. When the second controller 76 of the unmanned aerial vehicle 70 recognizes the marker 64, the second controller 76 causes the unmanned aerial vehicle 70 to fly toward the position of the marker 64. When the unmanned aerial vehicle 70 reaches above the marker 64, the second controller 76 causes the unmanned aerial vehicle 70 to land toward the arm 62 (marker 64) while gradually lowering the altitude of the unmanned aerial vehicle 70.

In the case of the skid 70d illustrated in FIG. 5A, the unmanned aerial vehicle 70 ends landing when the legs 80a and 80b of the skid 70d come into contact with the arm 62. In the case of the skid 70d illustrated in FIG. 5B, the unmanned aerial vehicle 70 swings the legs 80a and 80b toward the arm 62 by extension or contraction of the actuators 81a and 81b at the time when the skid 70d reaches the arm 62, and ends landing when the legs 80a and 80b come into contact with the arm 62. The extension or contraction of the actuators 81a and 81b is performed by the second controller 76 outputting control signals to the actuators 81a and 81b.

In the case of the skid 70d illustrated in FIG. 5C, when the skid 70d reaches the arm 62 and the legs 80a and 80b come into contact with the arm 62, the legs 80a and 80b of the unmanned aerial vehicle 70 are deformed by the contact with the arm 62. The unmanned aerial vehicle 70 ends landing when the arm 62 is sandwiched between the legs 80a and 80b.

As described above, by providing the takeoff/landing station 60 at the tractor 1, the unmanned aerial vehicle 70 can be landed on the tractor 1.

The unmanned aerial vehicle 70 may include a cable 77. Hereinafter, a case where the unmanned aerial vehicle 70 includes the cable 77 will be described.

The cable 77 is a cable to supply electric power to the unmanned aerial vehicle 70. As illustrated in FIG. 4, one end of the cable 77 is provided inside the main body 70a and is connected via a connector or the like to a power supply line PW1 that supplies electric power to the second controller 76 or the like. Alternatively, the one end of the cable 77 may be connected to the power storage 71. The other end of the cable 77 is connected via a connector or the like to a power supply line PW2 that supplies electric power to the first controller 40 or the like. The other end of the cable 77 may be connected to a battery or the like provided in the tractor 1. The prime mover 4 of the tractor 1 is provided with a power generator such as an alternator that generates electric power, and the electric power generated by the power generator is supplied to the power supply line PW2. Accordingly, the electric power generated by the tractor 1 or the electric power stored in the battery or the like can be supplied to the unmanned aerial vehicle 70.

Thus, the tractor 1 can supply the electric power to the unmanned aerial vehicle 70 via the cable 77, and the unmanned aerial vehicle 70 can fly for a long time as compared with a case where the unmanned aerial vehicle 70 is driven only by the power storage 71.

As illustrated in FIGS. 5A to 5C and FIG. 6, the arm 62 of the takeoff/landing station 60 has a through hole 65 through which the cable 77 passes, and the space 63 of the arm 62 serves as a housing capable of housing the cable 77. The housing is provided with a winder 66 to wind the cable 77. As illustrated in FIG. 7, the winder 66 includes a cylindrical bobbin (winding portion) 66a that is rotatably supported and winds the cable 77 by rotation, and a motor 66b that rotates the bobbin 66a. The cable 77 passes through a rotation shaft 66c that supports the bobbin 66a and reaches the inside of the tractor 1.

Thus, the winder 66 can wind the cable 77 around the bobbin 66a by rotating the bobbin 66a with the motor 66b. When the unmanned aerial vehicle 70 moves in a state in which the cable 77 is wound around the bobbin 66a, the cable 77 is pulled, the bobbin 66a is rotated desirably by the pulling force, and the cable 77 can be unwound. In the winder 66 of the preferred embodiment described above, a rotation shaft of the motor 66b and the rotation shaft 66c of the bobbin 66a are directly coupled to each other. However, the winder 66 may be provided with a clutch 66d capable of disconnecting the rotation shaft of the motor 66b and the rotation shaft 66c of the bobbin 66a from each other.

As described above, when the winder 66 is provided in the housing, the first controller 40 of the tractor 1 outputs a control signal to the motor 66b to rotate the rotation shaft of the motor 66b in a direction (winding direction) in which the cable 77 is wound. In a situation in which the rotation shaft of the motor 66b is rotated in the winding direction, a force (first load) acting on the rotation shaft of the motor 66b or a force (second load) acting on the rotation shaft 66c of the bobbin 66a is referred to. For example, when the cable 77 is pulled with movement of the unmanned aerial vehicle 70 and the first load or the second load becomes a predetermined value or more, the first controller 40 stops driving the motor 66b, that is, stops rotating the motor 66b in the winding direction. Alternatively, when the first load or the second load becomes the predetermined value or more, the first controller 40 rotates the motor 66b in a direction opposite to the winding direction to unwind the cable 77.

That is, the first controller 40 drives the winder 66 so that the tension acting on the cable 77 becomes substantially constant.

Figure 8A:
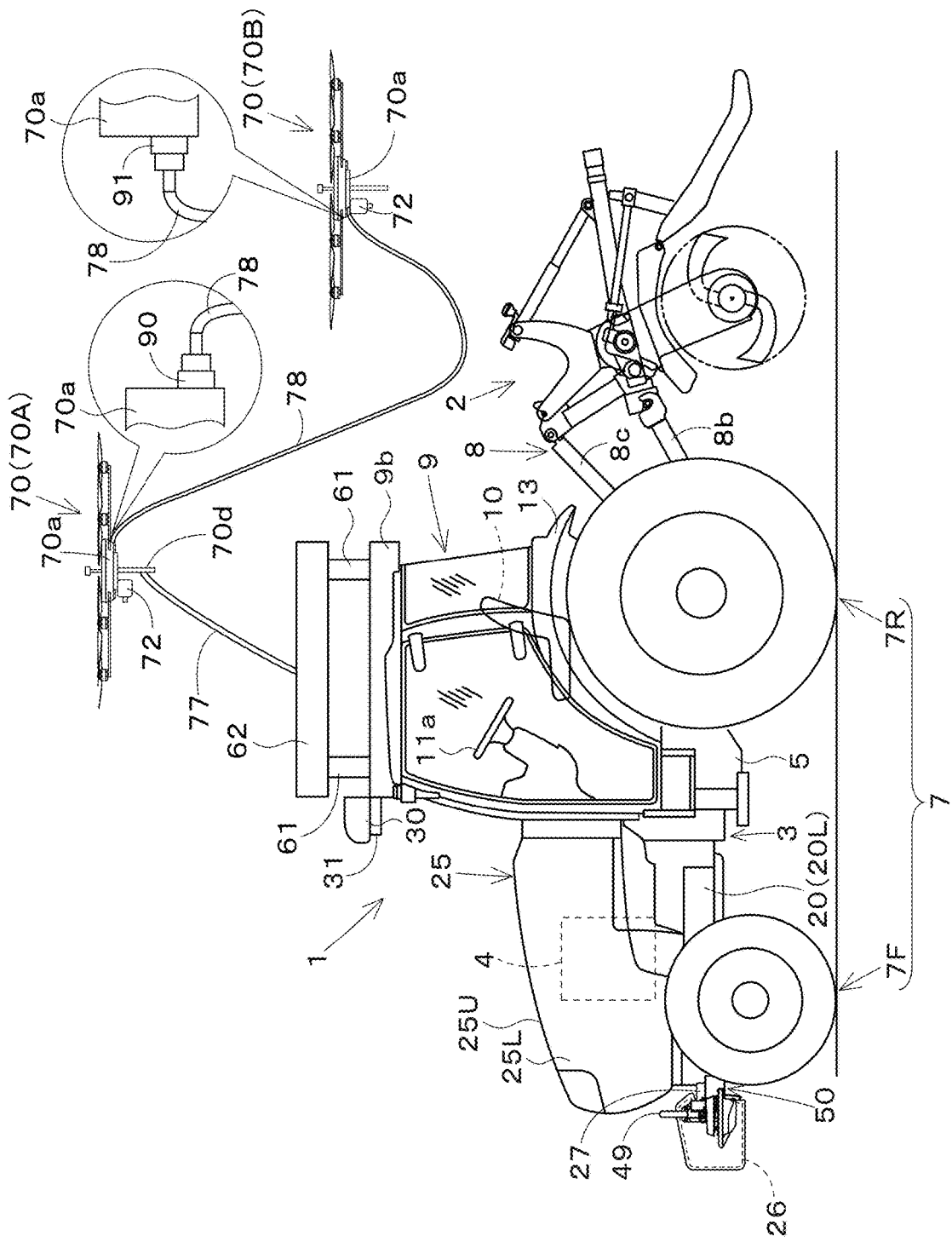
FIG. 8A illustrates a state in which a second unmanned aerial vehicle flies above a working implement.
Figure 8B:
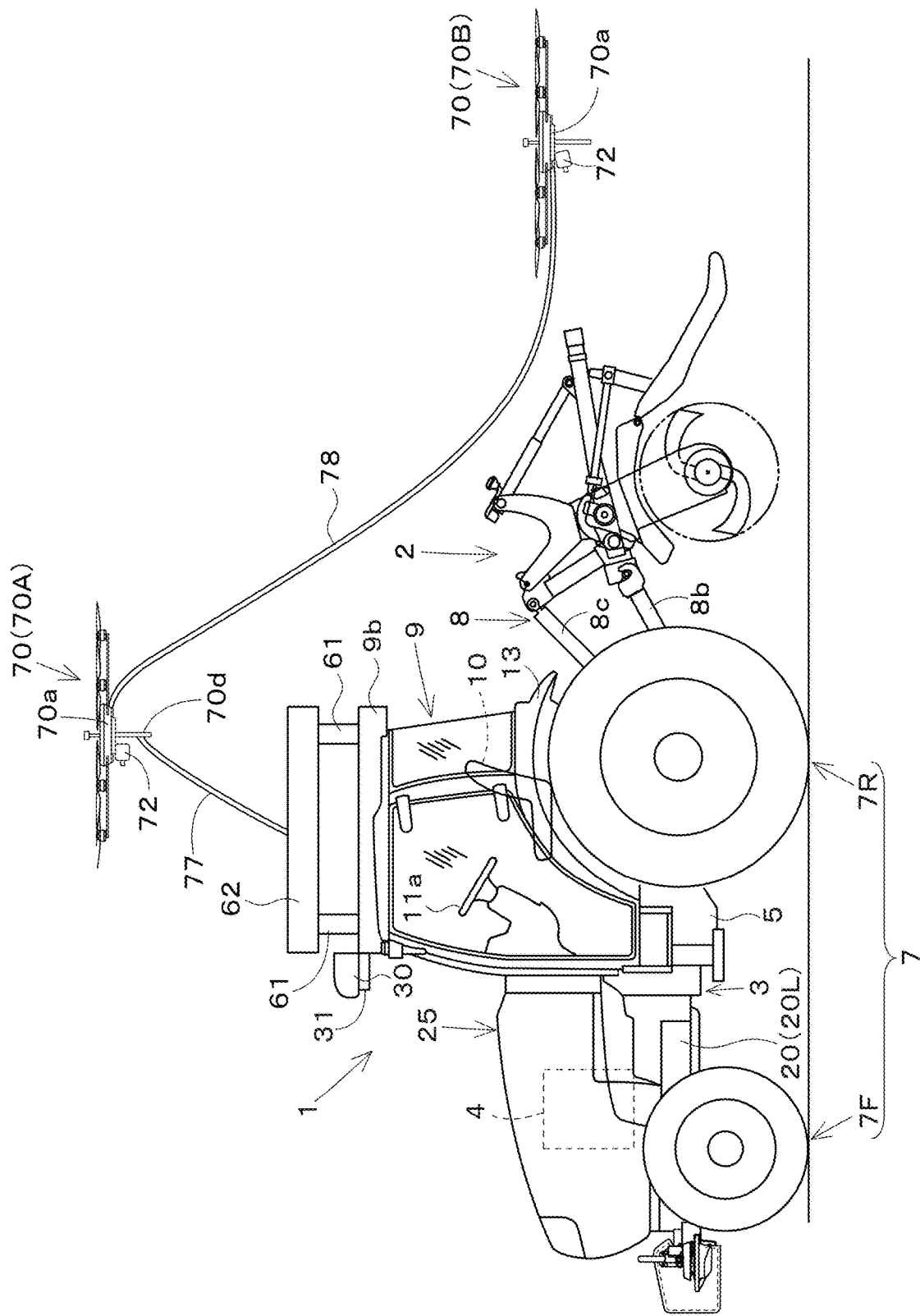
FIG. 8B illustrates a state in which the second unmanned aerial vehicle flies rearward of the working implement.
Figure 9A:
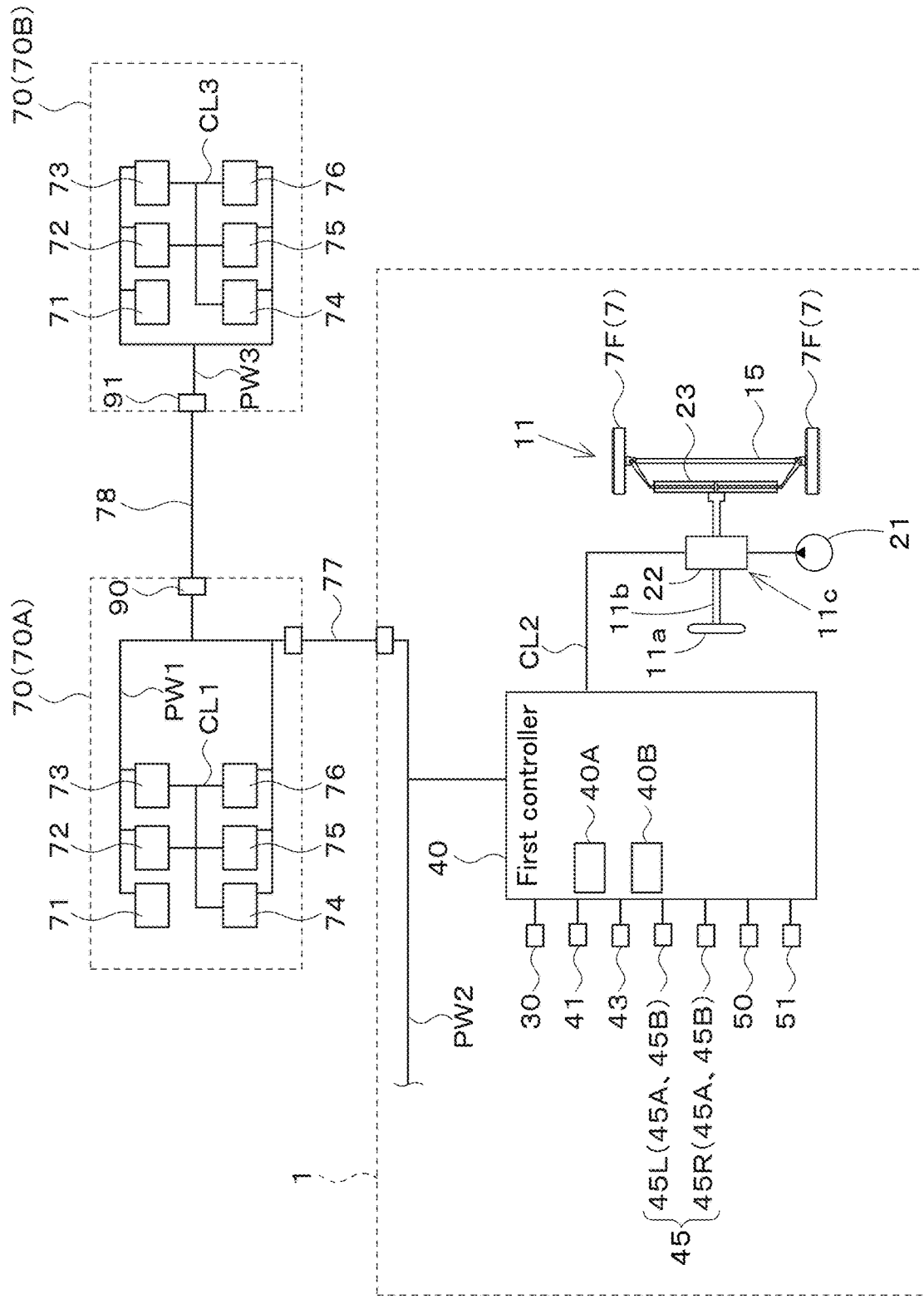
FIG. 9A is a control block diagram in a case where a first cable and a second cable are power supply cables.
Figure 9B:
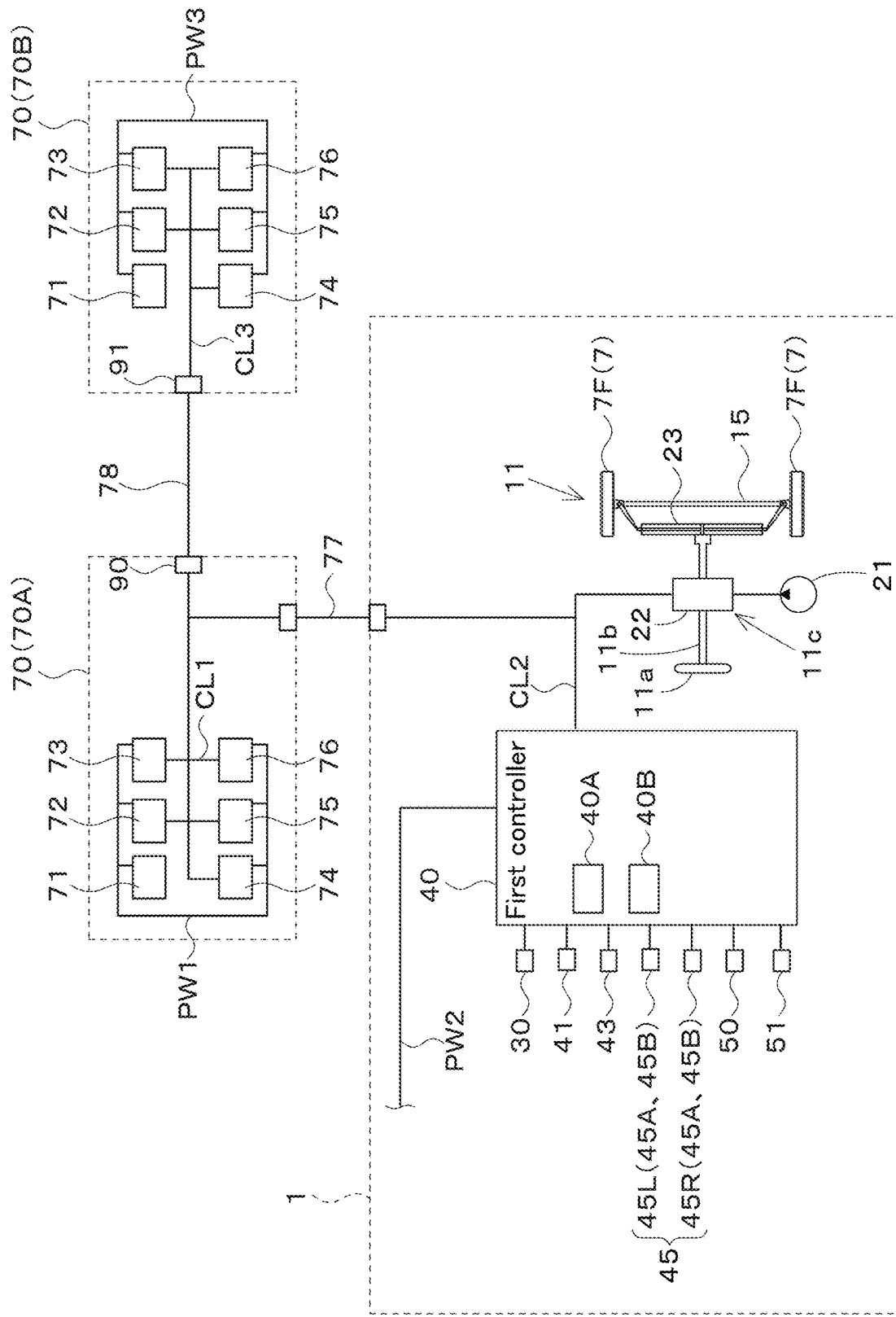
FIG. 9B is a control block diagram in a case where a first cable and a second cable are communication cables.

FIG. 8A and FIG. 8B are side views when two unmanned aerial vehicles 70 are coupled with the tractor 1. FIG. 9A and FIG. 9B are block diagrams of control when the two unmanned aerial vehicles 70 are coupled with the tractor 1.

Hereinafter, for convenience of description, among the two unmanned aerial vehicles 70, the unmanned aerial vehicle 70 coupled with the tractor 1 via the cable 77 is referred to as a first unmanned aerial vehicle 70A, and the unmanned aerial vehicle 70 coupled with the first unmanned aerial vehicle 70A via a cable 78 is referred to as a second unmanned aerial vehicle 70B. The cable 77 that couples the tractor 1 with the first unmanned aerial vehicle 70A is referred to as a first cable 77, and the cable 78 that couples the first unmanned aerial vehicle 70A with the second unmanned aerial vehicle 70B is referred to as a second cable 78. The configurations of the first unmanned aerial vehicle 70A and the second unmanned aerial vehicle 70B are substantially the same as the configuration of the unmanned aerial vehicle 70 described above.

Hereinafter, configurations of the first unmanned aerial vehicle 70A and the second unmanned aerial vehicle 70B different from the above-described configurations will be described.

As illustrated in FIG. 8A, a main body 70a of the first unmanned aerial vehicle 70A is provided with a connecting portion 90 to connect (couple) one end of the second cable 78. Also, a main body 70a of the second unmanned aerial vehicle 70B is provided with a connecting portion 91 to connect (couple) the other end of the second cable 78. The connecting portions 90 and 91 are, for example, connectors. The one end of the second cable 78 is detachably connectable to the connecting portion 90 of the first unmanned aerial vehicle 70A, and the other end of the second cable 78 is detachably connectable to the connecting portion 91 of the second unmanned aerial vehicle 70B. That is, the second cable 78 is attachable to and detachable from the first unmanned aerial vehicle 70A and the second unmanned aerial vehicle 70B.

The first cable 77 and the second cable 78 are cables for supplying electric power (power supply cables) or cables to transmit or receive signals (communication cables). As illustrated in FIG. 9A, when the first cable 77 and the second cable 78 are power supply cables, one end of the first cable 77 is connected to the power supply line PW1 or the power storage 71 provided in the first unmanned aerial vehicle 70A, and the other end is connected to the power supply line PW2, the battery, or the like, provided in the tractor 1. One end of the second cable 78 is connected to the power supply line PW1 or the power storage 71 provided in the first unmanned aerial vehicle 70A via the connecting portion 90. The other end of the second cable 78 is connected to a power supply line PW3 or the power storage 71 provided in the second unmanned aerial vehicle 70B via the connecting portion 91.

That is, when the first cable 77 and the second cable 78 are power supply cables, electric power or the like of the tractor 1 can be supplied to the first unmanned aerial vehicle 70A or the second unmanned aerial vehicle 70B. For example, the prime mover 4 of the tractor 1 is provided with a power generator such as an alternator that generates electric power, and the electric power generated by the power generator is supplied to the power supply line PW2. Thus, the electric power generated by the tractor 1 can be supplied not only to the first unmanned aerial vehicle 70A but also to the second unmanned aerial vehicle 70B.

As illustrated in FIG. 9B, when the first cable 77 and the second cable 78 are communication cables, one end of the first cable 77 is connected to a control line CL1 provided in the first unmanned aerial vehicle 70A, and the other end is connected to a control line CL2 provided in the tractor 1. One end of the second cable 78 is connected to the control line CL1 via the connecting portion 90, and the other end is connected to a control line CL3 provided in the second unmanned aerial vehicle 70B via the connecting portion 91.

That is, when the first cable 77 and the second cable 78 are communication cables, the tractor 1 can transmit various items of information to the first unmanned aerial vehicle 70A or the second unmanned aerial vehicle 70B, and the first unmanned aerial vehicle 70A or the second unmanned aerial vehicle 70B can transmit various items of information to the tractor 1.

For example, operation information of the tractor 1, a control signal to control the unmanned aerial vehicle 70 (the first unmanned aerial vehicle 70A, the second unmanned aerial vehicle 70B), and so forth, can be transmitted from the tractor 1 to the unmanned aerial vehicle 70, or operation information of the unmanned aerial vehicle 70, a control signal to control the tractor 1, and so forth, can be transmitted from the unmanned aerial vehicle 70 to the tractor 1. Alternatively, operation information or a control signal can be transmitted or received between the first unmanned aerial vehicle 70A and the second unmanned aerial vehicle 70B using a communication cable. The first cable 77 and the second cable 78 may include both a power supply cable and a communication cable.

As illustrated in FIG. 8A and FIG. 8B, the second unmanned aerial vehicle 70B flies to monitor the working implement 2. The first unmanned aerial vehicle 70A is an aerial vehicle that relays the second unmanned aerial vehicle 70B, and flies in association with the second unmanned aerial vehicle 70B (associated flight). The associated flight means that the second controller 76 of the first unmanned aerial vehicle 70A causes the first unmanned aerial vehicle 70A to fly in accordance with the state (position or operation) of the second unmanned aerial vehicle 70B.

Figure 10:
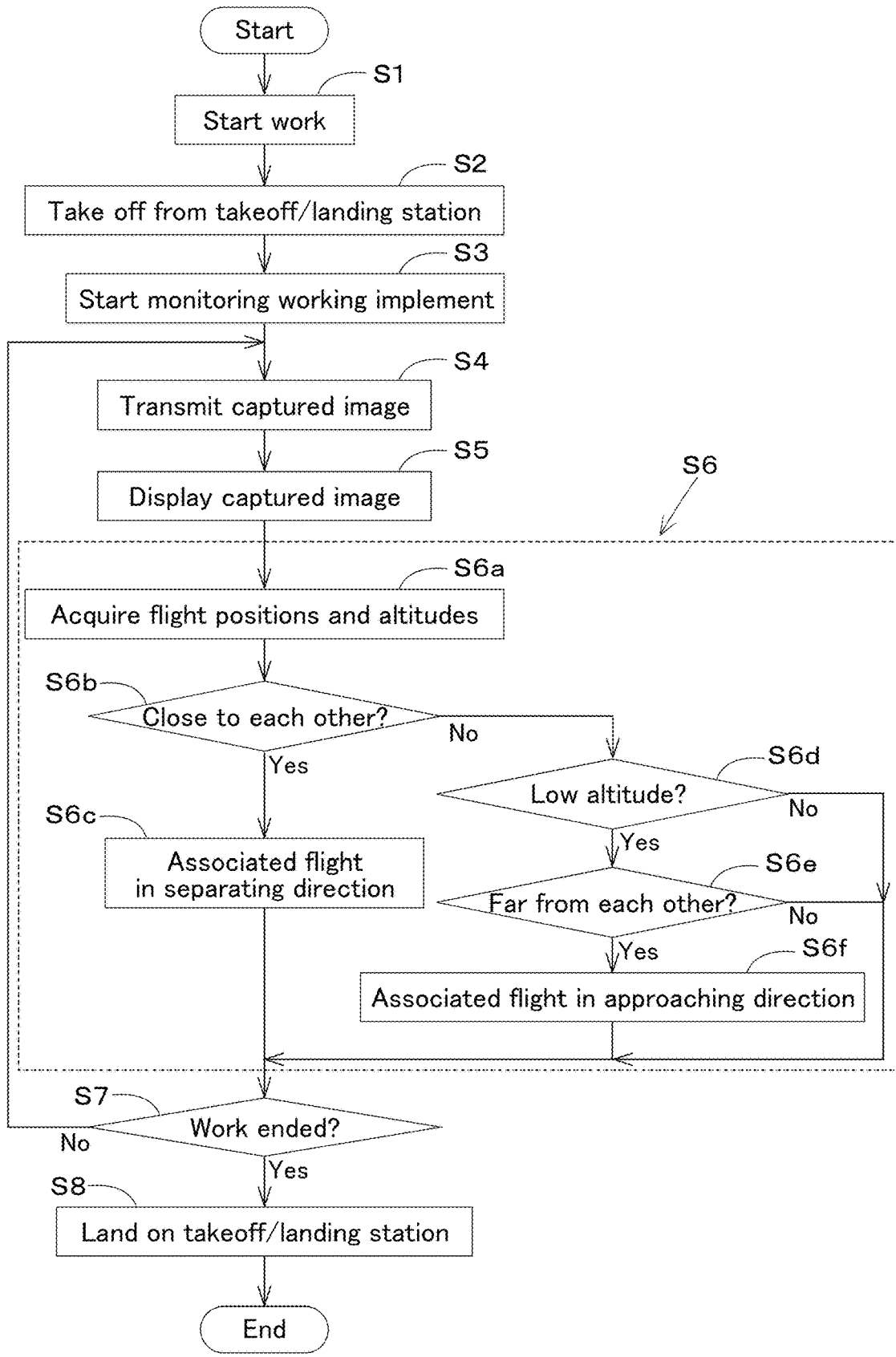
FIG. 10 is a flowchart of operations of a first unmanned aerial vehicle and a second unmanned aerial vehicle.

FIG. 10 is a flowchart of operations of the first unmanned aerial vehicle 70A and the second unmanned aerial vehicle 70B. In the description of FIG. 10, it is assumed that an initial state of the first unmanned aerial vehicle 70A and the second unmanned aerial vehicle 70B is a state of landing on the takeoff/landing station 60. In the description of FIG. 10, a case where the first cable 77 and the second cable 78 are power supply cables will be described as an example.

First, in a state in which the first unmanned aerial vehicle 70A and the second unmanned aerial vehicle 70B land on the takeoff/landing station 60, as illustrated in FIG. 10, the tractor 1 starts work using the working implement 2 while traveling in an agricultural field (S1). When the tractor 1 starts the work using the working implement 2 (S1), the first unmanned aerial vehicle 70A and the second unmanned aerial vehicle 70B take off from the takeoff/landing station 60 (S2). As illustrated in FIG. 8A and FIG. 8B, after takeoff, the second unmanned aerial vehicle 70B moves rearward of the tractor 1, that is, toward the working implement 2 located rearward of the hood 25, and monitors the working implement 2 with the sensor 72 (S3). For example, as illustrated in FIG. 8A, after takeoff, the second unmanned aerial vehicle 70B flies above the working implement 2 and captures an image of the working implement 2 from above with the sensor 72 to monitor the working implement 2. Alternatively, as illustrated in FIG. 8B, after takeoff, the second unmanned aerial vehicle 70B moves rearward of the working implement 2 and captures an image of the working implement 2 from the rear with the sensor 72 to monitor the working implement 2. The captured image captured by the second unmanned aerial vehicle 70B is transmitted to the tractor 1 by the second communication device 75 and can be displayed on the display 50.

The captured image of the working implement 2 obtained by the sensor 72 monitoring the working implement 2 (S3) and the sensor 72 of the second unmanned aerial vehicle 70B sensing the working implement 2 is transmitted to the tractor 1 via the second communication device 75 (S4). When the second communication device 75 transmits the captured image to the tractor 1 (S4), the captured image transmitted to the tractor 1 is displayed on the display 50 (S5). Thus, the operator or the like of the tractor 1 can grasp the working state of the working implement 2.

In contrast, the second controller 76 of the first unmanned aerial vehicle 70A performs flight in association with the second unmanned aerial vehicle 70B (S6: associated flight process).

When the first unmanned aerial vehicle 70A and the second unmanned aerial vehicle 70B fly in association with each other (S6), the second controllers 76 of the first unmanned aerial vehicle 70A and the second unmanned aerial vehicle 70B confirm whether the tractor 1 and the working implement 2 end the work (S7). For example, the second controllers 76 of the first unmanned aerial vehicle 70A and the second unmanned aerial vehicle 70B confirm whether the tractor 1 and the working implement 2 end the work based on the operation information received by the second communication devices 75 from the tractor. When the first cable 77 and the second cable 78 are communication cables, the second controllers 76 of the first unmanned aerial vehicle 70A and the second unmanned aerial vehicle 70B may confirm whether the tractor 1 and the working implement 2 end the work based on the operation information received via the communication cables.

When the second controllers 76 of the first unmanned aerial vehicle 70A and the second unmanned aerial vehicle 70B confirm that the work by the tractor 1 and the working implement 2 is ended (S7, Yes), the second controllers 76 control the first unmanned aerial vehicle 70A and the second unmanned aerial vehicle 70B, and the first unmanned aerial vehicle 70A and the second unmanned aerial vehicle 70B land on the takeoff/landing station 60 (S8). Accordingly, the first unmanned aerial vehicle 70A and the second unmanned aerial vehicle 70B end the flight.

Next, the associated flight process will be described in detail. The associated flight process is a process in which the second controller 76 of the first unmanned aerial vehicle 70A controls the first unmanned aerial vehicle 70A based on at least the flight position and the altitude of the second unmanned aerial vehicle 70B received by the second communication device 75, so that the first unmanned aerial vehicle 70A flies in association with the second unmanned aerial vehicle 70B.

In the associated flight process (S6), the second controller 76 of the first unmanned aerial vehicle 70A acquires the flight positions, altitudes, and so forth, of the first unmanned aerial vehicle 70A and the second unmanned aerial vehicle 70B (S6a). More specifically, the second controller 76 of the first unmanned aerial vehicle 70A acquires the flight position and the altitude of the first unmanned aerial vehicle 70A detected by the second position detector 73 of the first unmanned aerial vehicle 70A. Also, the second controller 76 of the first unmanned aerial vehicle 70A acquires the flight position and the altitude of the second unmanned aerial vehicle 70B detected by the second position detector 73 of the second unmanned aerial vehicle 70B via the second communication devices 75 of the first unmanned aerial vehicle 70A and the second unmanned aerial vehicle 70B.

When the second controller 76 of the first unmanned aerial vehicle 70A acquires the flight positions, the altitudes, and so forth, of the first unmanned aerial vehicle 70A and the second unmanned aerial vehicle 70B (S6a), the second controller 76 of the first unmanned aerial vehicle 70A determines whether the first unmanned aerial vehicle 70A and the second unmanned aerial vehicle 70B are relatively close to each other based on the flight position and the altitude of the first unmanned aerial vehicle 70A, and the flight position and the altitude of the second unmanned aerial vehicle 70B (S6b). Specifically, for example, the second controller 76 of the first unmanned aerial vehicle 70A calculates the distance between the first unmanned aerial vehicle 70A and the second unmanned aerial vehicle 70B based on the flight position and the altitude of the first unmanned aerial vehicle 70A and the flight position and the altitude of the second unmanned aerial vehicle 70B, and determines that the first unmanned aerial vehicle 70A and the second unmanned aerial vehicle 70B are relatively close to each other when the distance is less than a predetermined first threshold.

As illustrated in FIG. 11A, when the first unmanned aerial vehicle 70A and the second unmanned aerial vehicle 70B are relatively close to each other, the distance between the first unmanned aerial vehicle 70A and the second unmanned aerial vehicle 70B is relatively small, and the second cable 78 may come into contact with the tractor 1 or the working implement 2. Thus, the second controller 76 of the first unmanned aerial vehicle 70A can estimate the state of the second cable 78 by determining whether the first unmanned aerial vehicle 70A and the second unmanned aerial vehicle 70B are relatively close to each other.

When the second controller 76 of the first unmanned aerial vehicle 70A determines that the first unmanned aerial vehicle 70A and the second unmanned aerial vehicle 70B are relatively close to each other (S6b, Yes), the second controller 76 of the first unmanned aerial vehicle 70A performs control so that the first unmanned aerial vehicle 70A flies in a direction away from the second unmanned aerial vehicle 70B (separating direction) (associated flight) (S6c).

Thus, as illustrated in FIG. 11A, when the distance between the first unmanned aerial vehicle 70A and the second unmanned aerial vehicle 70B is relatively small and there is a possibility that the second cable 78 comes into contact with the tractor 1 or the working implement 2, the second controller 76 of the first unmanned aerial vehicle 70A can prevent or reduce contact of the second cable 78 with the tractor 1 or the working implement 2 by moving the first unmanned aerial vehicle 70A away from the second unmanned aerial vehicle 70B (associated flight).

When the second controller 76 of the first unmanned aerial vehicle 70A determines that the first unmanned aerial vehicle 70A and second unmanned aerial vehicle 70B are not relatively close to each other (S6b, No), the second controller 76 of the first unmanned aerial vehicle 70A determines whether the altitude of the second unmanned aerial vehicle 70B received by the second communication device 75 is relatively low (S6d). Specifically, the second controller 76 of the first unmanned aerial vehicle 70A confirm whether the altitude of the second unmanned aerial vehicle 70B is less than a predetermined second threshold, and determines whether the altitude of the second unmanned aerial vehicle 70B is relatively low.

When the second controller 76 of the first unmanned aerial vehicle 70A determines that the altitude of the second unmanned aerial vehicle 70B received by the second communication device 75 is relatively low (S6d, Yes), the second controller 76 determines whether the first unmanned aerial vehicle 70A and the second unmanned aerial vehicle 70B are relatively far from each other based on the flight position and the altitude of the first unmanned aerial vehicle 70A and the flight position and the altitude of the second unmanned aerial vehicle 70B (S6e). Specifically, for example, the second controller 76 of the first unmanned aerial vehicle 70A calculates the distance between the first unmanned aerial vehicle 70A and the second unmanned aerial vehicle 70B based on the flight position and the altitude of the first unmanned aerial vehicle 70A and the flight position and the altitude of the second unmanned aerial vehicle 70B, and determines that the first unmanned aerial vehicle 70A and the second unmanned aerial vehicle 70B are relatively far from each other when the distance is a predetermined third threshold or more.

Figure 11B:
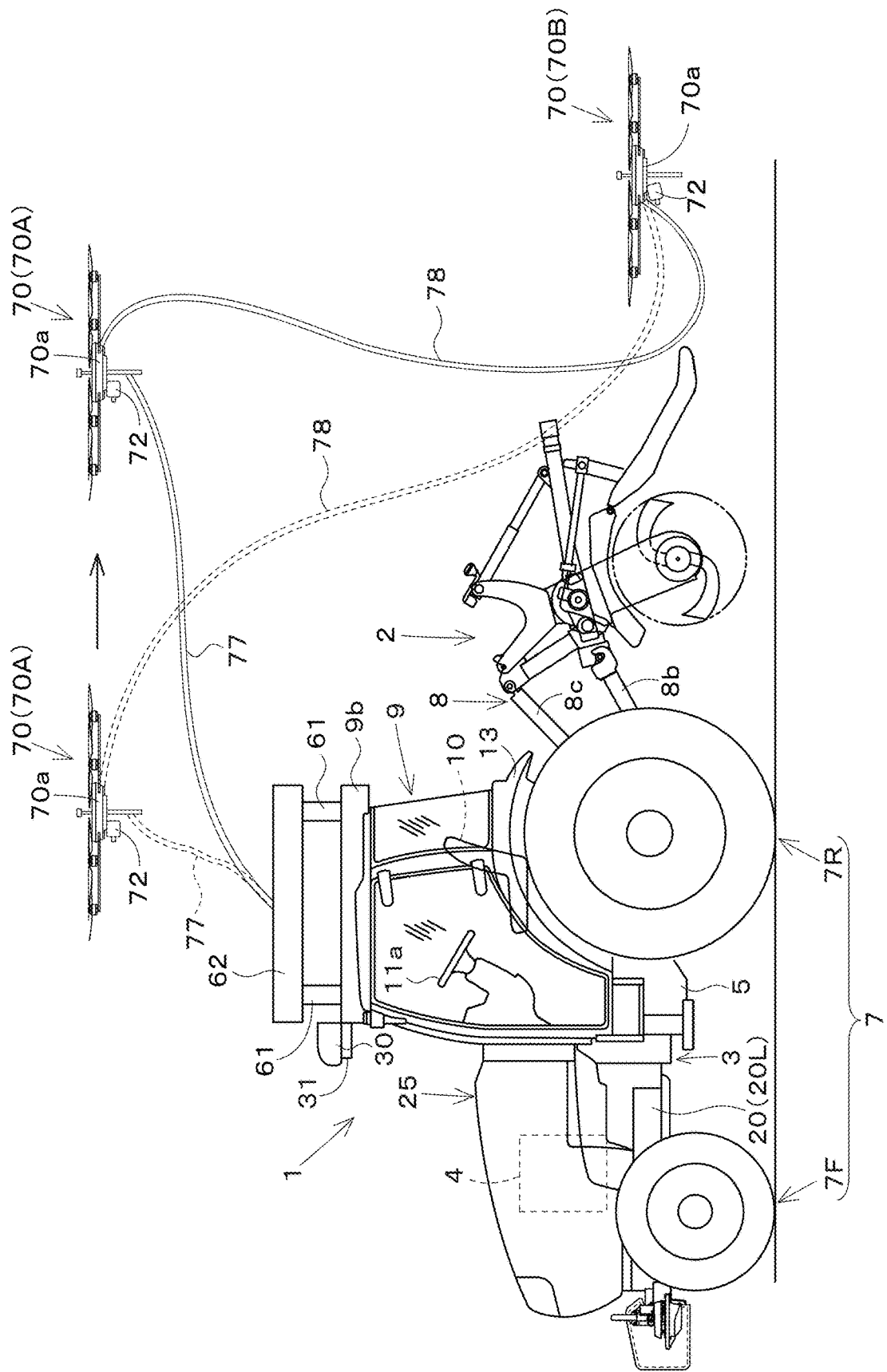
FIG. 11B illustrates flight of the first unmanned aerial vehicle and the second unmanned aerial vehicle different from that in FIG. 11A.

As illustrated in FIG. 11B, when the altitude of the second unmanned aerial vehicle 70B received by the second communication device 75 is relatively low and the first unmanned aerial vehicle 70A and the second unmanned aerial vehicle 70B are relatively far from each other, the second cable 78 may come into contact with the tractor 1 or the working implement 2. Thus, the second controller 76 of the first unmanned aerial vehicle 70A can estimate the state of the second cable 78 by determining whether the altitude of the second unmanned aerial vehicle 70B is relatively low and whether the first unmanned aerial vehicle 70A and the second unmanned aerial vehicle 70B are relatively far from each other.

When the second controller 76 of the first unmanned aerial vehicle 70A determines that the first unmanned aerial vehicle 70A and the second unmanned aerial vehicle 70B are relatively far from each other (S6e, Yes), the second controller 76 of the first unmanned aerial vehicle 70A performs control so that the first unmanned aerial vehicle 70A flies in a direction toward the second unmanned aerial vehicle 70B (approaching direction) (associated flight) (S6f). In such a case, for example, the second controller 76 of the first unmanned aerial vehicle 70A performs control so that the first unmanned aerial vehicle 70A flies in the horizontal direction (flies in an associated manner) so as to approach the second unmanned aerial vehicle 70B and the second cable 78 extends in the substantially vertical direction.

Thus, as illustrated in FIG. 11B, when the altitude of the second unmanned aerial vehicle 70B is too low and the first unmanned aerial vehicle 70A and the second unmanned aerial vehicle 70B are relatively far from each other, and thus when there is a possibility that the second cable 78 comes into contact with the tractor 1 or the working implement 2, the first unmanned aerial vehicle 70A flies in the direction toward the second unmanned aerial vehicle 70B. Thus, the first unmanned aerial vehicle 70A performs associated flight so that the second cable 78 does not come into contact with the tractor 1 or the working implement 2.

Accordingly, the second controller 76 of the first unmanned aerial vehicle 70A estimates the state of the second cable 78 from the flight position and the altitude of the first unmanned aerial vehicle 70A and the flight position and the altitude of the second unmanned aerial vehicle 70B, adjusts the flight position and the altitude of the first unmanned aerial vehicle 70A so that the second cable 78 does not come into contact with the tractor 1 or the working implement 2, and causes the first unmanned aerial vehicle 70A to fly in association with the second unmanned aerial vehicle 70B. In the above-described preferred embodiment, the second controller 76 of the first unmanned aerial vehicle 70A estimates the state of the second cable 78 from the flight position and the altitude of the first unmanned aerial vehicle 70A and the flight position and the altitude of the second unmanned aerial vehicle 70B. However, the first unmanned aerial vehicle 70A may sense the state (position) of the second cable 78 with the sensor 72 of the first unmanned aerial vehicle 70A, and the second controller 76 may cause the first unmanned aerial vehicle 70A to fly in an associated manner based on the result sensed by the sensor 72. In such a case, the sensor 72 senses whether the distance between the second cable 78 and the tractor 1 or the working implement 2 is a predetermined distance or less, and the second controller 76 causes the first unmanned aerial vehicle 70A to fly in an associated manner so that the second cable 78 moves away from the tractor 1 or the working implement 2.

As described above, during the work by the tractor 1 and the working implement 2, the second unmanned aerial vehicle 70B can monitor the working state or the like of the working implement 2, while the first unmanned aerial vehicle 70A can prevent the second cable 78 from coming into contact with the tractor 1 or the working implement 2.

In the above-described preferred embodiment, the first unmanned aerial vehicle 70A flies so that the second cable 78 or the like does not come into contact with the tractor 1 or the working implement 2. However, in addition to this, the first unmanned aerial vehicle 70A may perform sensing in a surrounding area of the tractor 1 from above the tractor 1 with the sensor 72 while the second unmanned aerial vehicle 70B may perform sensing for the working implement 2 or a surrounding area of the working implement 2. That is, the first unmanned aerial vehicle 70A may perform sensing in the surrounding area of the tractor 1, and the second unmanned aerial vehicle 70B may perform sensing in the surrounding area of the working implement 2.

In such a case, the sensor 72 of the first unmanned aerial vehicle 70A captures an image of a working state (working trace) after the work with the working implement 2, or detects an obstacle in the surrounding area of the working implement 2 or the tractor 1, for example. In this case, for example, the data sensed by the first unmanned aerial vehicle 70A and the data sensed by the second unmanned aerial vehicle 70B are transmitted to the tractor 1 via the second communication devices 75 or the like. In the tractor 1, the received sensing data is displayed on the display 50 or the like.

Figure 12A:
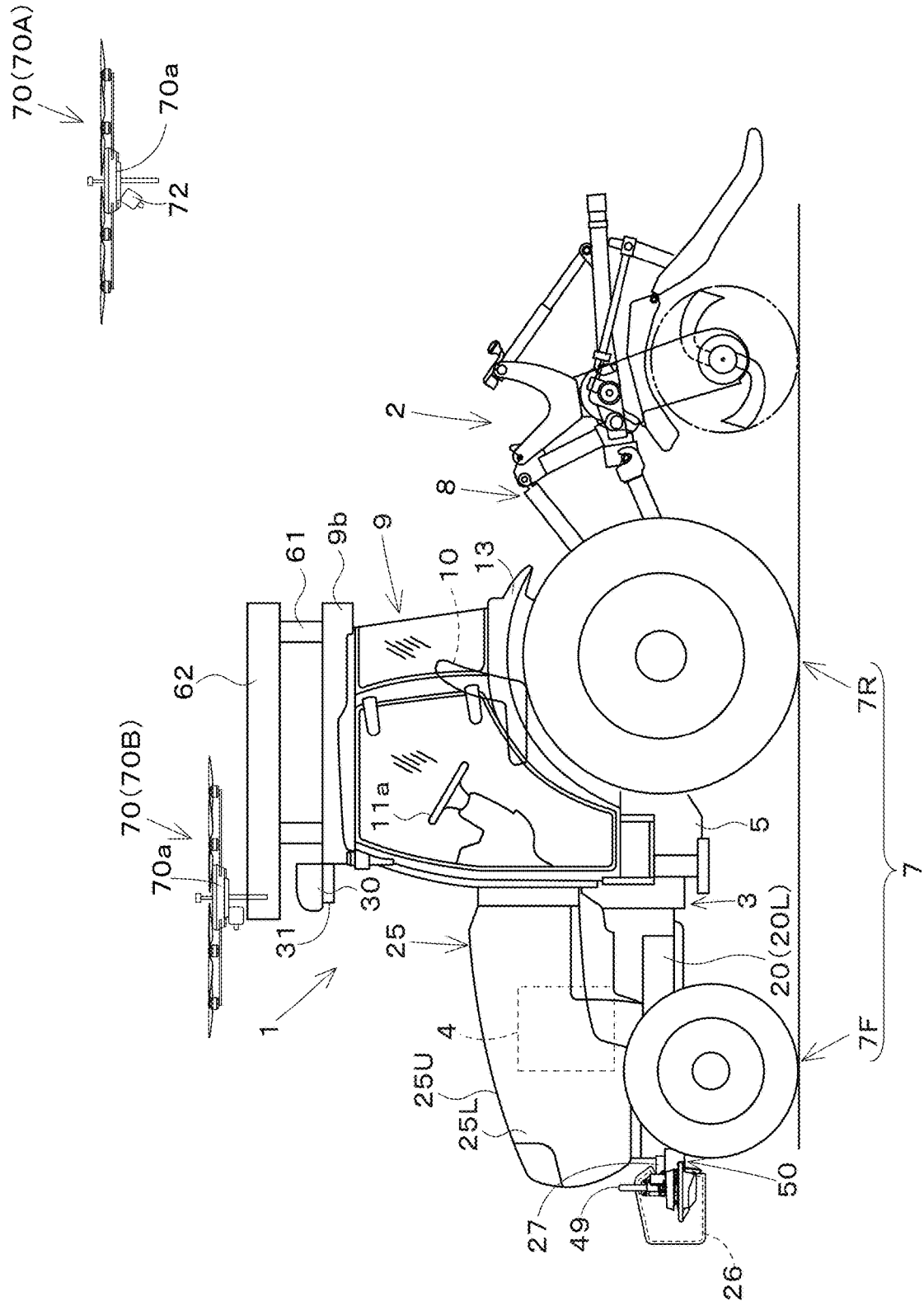
FIG. 12A illustrates flight of the first unmanned aerial vehicle.

Although both the first unmanned aerial vehicle 70A and the second unmanned aerial vehicle 70B fly in the operations of FIG. 10, as illustrated in FIG. 12A, only the first unmanned aerial vehicle 70A may fly above the working implement 2 and the working implement 2 may be monitored by the sensor 72 of the first unmanned aerial vehicle 70A in a state in which the second unmanned aerial vehicle 70B is held on the takeoff/landing station 60. In this case, the second cable 78 coupling the first unmanned aerial vehicle 70A with the second unmanned aerial vehicle 70B is removed from the first unmanned aerial vehicle 70A and the second unmanned aerial vehicle 70B. With this configuration, although the first unmanned aerial vehicle 70A and the second unmanned aerial vehicle 70B can be coupled by the second cable 78, when the first unmanned aerial vehicle 70A flies alone, the second cable 78 can be prevented from interfering with the flight.

Figure 12B:
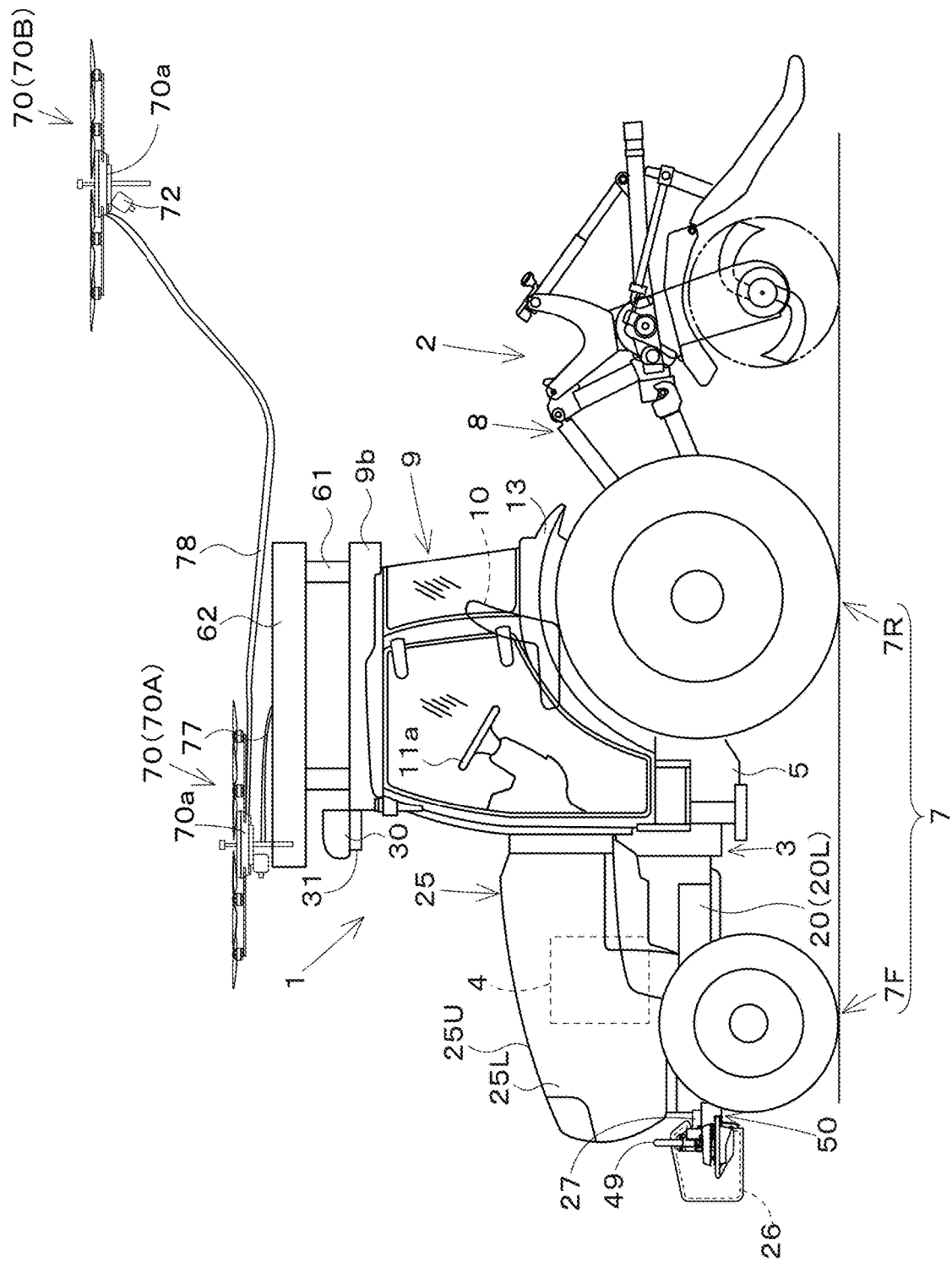
FIG. 12B illustrates flight of the second unmanned aerial vehicle.

Alternatively, as illustrated in FIG. 12B, only the second unmanned aerial vehicle 70B may fly above the working implement 2 in a state in which the first unmanned aerial vehicle 70A is held on the takeoff/landing station 60, and the working implement 2 may be monitored with the sensor 72 of the second unmanned aerial vehicle 70B. In this case, the second cable 78 coupling the first unmanned aerial vehicle 70A and the second unmanned aerial vehicle 70B is kept connected. In this way, electric power can be supplied from the second cable 78 to cause the second unmanned aerial vehicle 70B to fly alone.

Similarly to the winder 66 in FIG. 7, a winder that winds the second cable 78 may be provided in the first unmanned aerial vehicle 70A, and the length of the second cable 78 may be adjusted by winding the second cable 78 with the winder provided in the first unmanned aerial vehicle 70A.

An agricultural machine (tractor 1) includes a traveling vehicle body 3 a coupler 8 to couple a working implement 2 with the traveling vehicle body 3, and a takeoff/landing station 60 to restrict a skid 70d of an unmanned aerial vehicle 70 when the unmanned aerial vehicle 70 takes off or lands. With this, the unmanned aerial vehicle 70 can be easily caused to land on and take off from the agricultural machine (tractor 1). In particular, since the takeoff/landing station 60 restricts the skid 70d when the unmanned aerial vehicle 70 lands, it is possible to achieve a compact landing space compared to a takeoff/landing station that does not restrict the skid 70d. Furthermore, the unmanned aerial vehicle 70 can fly above the agricultural machine immediately from the takeoff/landing station 60, it is possible to quickly assist the agricultural machine (tractor 1) in performing work, and hence it is possible to improve work efficiency.

The agricultural machine (tractor 1) may include a protector 9 to protect an operator's seat. The takeoff/landing station 60 may be provided on the protector 9. With this, the unmanned aerial vehicle 70 can easily take off from and land on the protector 9.

The takeoff/landing station 60 may be attached to the protector 9 and include an arm 62 extending in a horizontal direction when the unmanned aerial vehicle 70 takes off or lands. With this, the arm 62 extending in the horizontal direction allows the unmanned aerial vehicle 70 to easily land on the protector 9.

The arm 62 may include a first member 62A fixed to the protector 9 and a second member 62B movably provided on the first member 62A. With this, the range of the takeoff from or landing on the takeoff/landing station 60 can be freely changed by the second member 62B, making it easy the takeoff from and landing on the takeoff/landing station 60.

The arm 62 may include a marker 64 visually recognizable by the unmanned aerial vehicle 70. With this, the unmanned aerial vehicle 70 can land while visually recognizing the marker 64, so that the unmanned aerial vehicle 70 can land more easily.

The unmanned aerial vehicle 70 may include a cable 77 to supply electric power. The takeoff/landing station 60 may include a housing (space 63) to house the cable 77. With this, electric power can be supplied from the agricultural machine (tractor 1) to the unmanned aerial vehicle 70 by the cable 77, making it possible to increase the flight time of the unmanned aerial vehicle 70. Furthermore, since the cable 77 can be housed in the housing, it is possible to eliminate or reduce the likelihood that the cable 77 will hinder the takeoff and landing of the unmanned aerial vehicle 70.

The takeoff/landing station 60 may include a winder 66 to wind the cable 77. With this, the cable 77 can be wound, and the cable 77 can be compactly stored in the agricultural machine (tractor 1).

An agricultural machine (tractor 1) includes a traveling vehicle body 3, a first cable 77 attached to the traveling vehicle body 3 and coupled to a first unmanned aerial vehicle 70A, and a second cable 78 to couple the first unmanned aerial vehicle 70A with a second unmanned aerial vehicle 70B different from the first unmanned aerial vehicle 70A. With this, the agricultural machine (tractor 1), the first unmanned aerial vehicle 70A and the second unmanned aerial vehicle 70B can be coupled by the first cable 77 and the second cable 78, and an electrical signal or the like can be supplied from the agricultural machine (tractor 1) to the first unmanned aerial vehicle 70A and the second unmanned aerial vehicle 70B via the first cable 77 and the second cable 78. It follows that at least the first unmanned aerial vehicle 70A and the second unmanned aerial vehicle 70B can quickly assist the agricultural machine (tractor 1) in performing work, thus improving work efficiency. In addition, it is possible to prevent or reduce contact of the second cable 78 with the agricultural machine or the like due to the flight of the first unmanned aerial vehicle 70A or the like.

The agricultural machine (tractor 1) may include a protector 9 to protect an operator's seat. The takeoff/landing station 60 may be provided on the protector 9. With this, the unmanned aerial vehicle 70 can easily take off from or land on the protector 9.

The first cable 77 and the second cable 78 may be cables to supply electric power. With this, electric power can be supplied from the agricultural machine (tractor 1) to the first unmanned aerial vehicle 70A and the second unmanned aerial vehicle 70B, making it possible to increase the flight time of the first unmanned aerial vehicle 70A and the second unmanned aerial vehicle 70B.

The first cable 77 and the second cable 78 may be cables to transmit and receive a signal to and from the first unmanned aerial vehicle 70A and the second unmanned aerial vehicle 70B. With this, information relating to the agricultural machine (tractor 1) can be transmitted to the first unmanned aerial vehicle 70A and the second unmanned aerial vehicle 70B by wire or information relating to the first unmanned aerial vehicle 70A and the second unmanned aerial vehicle 70B can be transmitted to the agricultural machine (tractor 1), so that necessary information can be shared among the agricultural machine (tractor 1), the first unmanned aerial vehicle 70A, and the second unmanned aerial vehicle 70B.

The agricultural machine (tractor 1) may further include a protector 9 to protect an operator's seat. The first cable 77 may be provided on the protector 9. With this, the agricultural machine (tractor 1) and the first unmanned aerial vehicle 70A can be easily connected to each other by the first cable 77, and, by providing the first cable 77 on the protector 9, it is possible to prevent or reduce contact of the first cable 77 with a portion of the agricultural machine (tractor 1) different from the protector 9 when the first unmanned aerial vehicle 70A is flying.

The second unmanned aerial vehicle 70B may include a sensor 72 to sense a working implement 2 coupled to the traveling vehicle body 3, and be operable to fly toward the working implement 2 when sensing the working implement 2. The first unmanned aerial vehicle 70A may be operable to fly in association with flight of the second unmanned aerial vehicle 70B. With this, the second unmanned aerial vehicle 70B can sense the working implement 2 during work or the like, and the first unmanned aerial vehicle 70A can prevent or reduce contact of the second cable 78 with the tractor 1 or the working implement 2.

The sensor 72 may include an imager to capture an image of the working implement 2. With this, it is possible to obtain a captured image of the working implement 2 doing work, and it is possible to easily know what state the working implement 2 is in.

The first unmanned aerial vehicle 70A may include a sensor 72 to sense a working implement 2 coupled to the traveling vehicle body 3. With this, the working implement 2 can be sensed by the first unmanned aerial vehicle 70A alone.

The agricultural machine (tractor 1) may include a takeoff/landing station 60 for takeoff and landing of the first unmanned aerial vehicle 70A and/or the second unmanned aerial vehicle 70B. The second unmanned aerial vehicle 70B may be operable to fly while the first unmanned aerial vehicle 70A is on the takeoff/landing station 60. With this, only the second unmanned aerial vehicle 70B can fly above the working implement 2 or the like, and the working implement 2 or the like can be monitored by the second unmanned aerial vehicle 70B.

The traveling vehicle body 3 may include a winder 66 to wind the first cable 77. With this, the first cable 77 can be wound, and the first cable 77 can be compactly stored in the agricultural machine (tractor 1).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
   a traveling vehicle body;
   a coupler to couple a working implement with the traveling vehicle body;
   a takeoff/landing station to restrict a skid of an unmanned aerial vehicle when the unmanned aerial vehicle takes off or lands; and
   a protector to protect an operator's seat; wherein
   the takeoff/landing station is attached to the protector and includes an arm extending in a horizontal direction when the unmanned aerial vehicle takes off or lands.

2. The agricultural machine according to claim 1, wherein the arm includes a first member fixed to the protector and a second member movably provided on the first member.

3. The agricultural machine according to claim 1, wherein the arm includes a marker visually recognizable by the unmanned aerial vehicle.

4. The agricultural machine according to claim 1, wherein
   the unmanned aerial vehicle includes a cable to supply electric power; and
   the takeoff/landing station includes a housing to house the cable.

5. The agricultural machine according to claim 4, wherein the takeoff/landing station includes a winder to wind the cable.

* * * * *